(12) United States Patent
Kurokawa

(10) Patent No.: US 9,703,704 B2
(45) Date of Patent: Jul. 11, 2017

(54) SEMICONDUCTOR DEVICE

(71) Applicant: Semiconductor Energy Laboratory Co., Ltd., Atsugi-shi, Kanagawa-ken (JP)

(72) Inventor: Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1011 days.

(21) Appl. No.: 13/870,151

(22) Filed: Apr. 25, 2013

(65) Prior Publication Data

US 2013/0297874 A1 Nov. 7, 2013

(30) Foreign Application Priority Data

May 1, 2012 (JP) ................. 2012-104839

(51) Int. Cl.
*G06F 12/00* (2006.01)
*G06F 13/00* (2006.01)
*G06F 13/28* (2006.01)
*G06F 12/0802* (2016.01)
*G06F 1/32* (2006.01)

(52) U.S. Cl.
CPC ........ *G06F 12/0802* (2013.01); *G06F 1/3225* (2013.01); *G06F 1/3287* (2013.01); *Y02B 60/1282* (2013.01)

(58) Field of Classification Search
CPC ............................ G06F 12/0802; G06F 1/3225
USPC .......................................................... 711/118
See application file for complete search history.

(56) References Cited

U.S. PATENT DOCUMENTS 4,017,741 A * 4/1977 Briggs ................. G11C 19/184
 326/97
5,430,881 A 7/1995 Ikeda
5,475,848 A 12/1995 Ikeda
5,731,856 A 3/1998 Kim et al.
(Continued)

FOREIGN PATENT DOCUMENTS

EP 0573651 A 12/1993
EP 1 737 044 A1 12/2006
(Continued)

OTHER PUBLICATIONS

Intel Microsoft Toshiba, Advance Configuration and Power Interface Specification, Dec. 22, 1996.*
(Continued)

*Primary Examiner* — Charles Rones
*Assistant Examiner* — Sidney Li
(74) *Attorney, Agent, or Firm* — Fish & Richardson P.C.

(57) ABSTRACT

To provide a semiconductor device with less power consumption. In a semiconductor device including a CPU, the frequency of access to a cache memory is monitored. In the case where the access frequency is uniform, supply of a power supply voltage to the CPU is stopped. In the case where the access frequency is not uniform, stop of supplying the power supply voltage is performed on memories with a time interval, and eventually, supply of the power supply voltage to the CPU is stopped. Further, write back processing is efficiently performed in accordance with determination of a dirty bit, so that power consumption of the semiconductor device can be further achieved.

19 Claims, 14 Drawing Sheets

(56) References Cited

U.S. PATENT DOCUMENTS

| | | | |
|---|---|---|---|
| 5,744,864 A | 4/1998 | Cillessen et al. | |
| 6,127,702 A | 10/2000 | Yamazaki et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 7,818,502 B2 | 10/2010 | Kurokawa | |
| 2001/0046027 A1 | 11/2001 | Tai et al. | |
| 2001/0049771 A1* | 12/2001 | Tischler | G06F 12/121 711/133 |
| 2002/0049918 A1* | 4/2002 | Kaxiras | G11C 5/143 713/300 |
| 2002/0056838 A1 | 5/2002 | Ogawa | |
| 2002/0129191 A1* | 9/2002 | DaCosta | G06F 12/0893 711/103 |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0209248 A1 | 8/2008 | Priel et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0148171 A1 | 6/2010 | Hayashi et al. | |
| 2010/0281222 A1* | 11/2010 | Liu | G06F 12/0833 711/133 |
| 2013/0139007 A1* | 5/2013 | Higo | G06F 11/1666 714/54 |

FOREIGN PATENT DOCUMENTS

| | | |
|---|---|---|
| EP | 2 226 847 A2 | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-089130 A | 3/1994 |
| JP | 08-006681 A | 1/1996 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2001-028564 A | 1/2001 |
| JP | 2002-076356 A | 3/2002 |
| JP | 2002-108702 A | 4/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-309734 A | 11/2006 |
| JP | 2008-234320 A | 10/2008 |
| JP | 2008-305305 A | 12/2008 |
| WO | 2004/114391 A1 | 12/2004 |
| WO | WO-2006/106890 | 10/2006 |

OTHER PUBLICATIONS

Ohara, H et al., "Amorphous In—Ga—Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

(56) References Cited

OTHER PUBLICATIONS

Orita, M et al., "Mechanism of Electrical Conductivity of Transparent InGaZnO4," Phys. Rev. B (Physical Review. B), Jan. 15, 2000, vol. 61, No. 3, pp. 1811-1816.
Osada, T et al., "15.2: Development of Driver-Integrated Panel using Amorphous In—Ga—Zn-Oxide TFT," SID Digest '09 : SID International Symposium Digest of Technical Papers, May 31, 2009, pp. 184-187.
Osada, T et al., "Development of Driver-Integrated Panel Using Amorphous In—Ga—Zn-Oxide TFT," AM-FPD '09 Digest of Technical Papers, Jul. 1, 2009, pp. 33-36.
Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.
Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.
Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.
Park, J et al., "High performance amorphous oxide thin film transistors with self-aligned top-gate structure," IEDM 09: Technical Digest of International Electron Devices Meeting, Dec. 7, 2009, pp. 191-194.
Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.
Park, J et al., "Amorphous Indium-Gallium-Zinc Oxide TFTs and Their Application for Large Size AMOLED," AM-FPD '08 Digest of Technical Papers, Jul. 2, 2008, pp. 275-278.
Park, S et al., "Challenge to Future Displays: Transparent AM-OLED Driven by PEALD Grown ZnO TFT," IMID '07 Digest, 2007, pp. 1249-1252.
Prins, M et al., "A Ferroelectric Transparent Thin-Film Transistor," Appl. Phys. Lett. (Applied Physics Letters), Jun. 17, 1996, vol. 68, No. 25, pp. 3650-3652.
Sakata, J et al., "Development of 4.0-in. AMOLED Display With Driver Circuit Using Amorphous In—Ga—Zn-Oxide TFTs," IDW '09 : Proceedings of the 16th International Display Workshops, 2009, pp. 689-692.
Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.
Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.
Tsuda, K et al., "Ultra Low Power Consumption Technologies for Mobile TFT-LCDs," Proceedings of the 9th International Display Workshops, Dec. 4, 2002, pp. 295-298.
Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.
Van De Walle, C, "Hydrogen as a Cause of Doping in Zinc Oxide," Phys. Rev. Lett. (Physical Review Letters), Jul. 31, 2000, vol. 85, No. 5, pp. 1012-1015.
Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.
Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.
Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.
Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.
Clark, S et al., "First Principles Methods Using CASTEP," Zeitschrift fur Kristallographie, 2005, vol. 220, pp. 567-570.
Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.
Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.
Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.
Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.
Fung, T et al., "2-D Numerical Simulation of High Performance Amorphous In—Ga—Zn—O TFTs for Flat Panel Displays,"AM-FPD '08 Digest of Technical Papers, Jul. 2, 2008, pp. 251-252, The Japan Society of Applied Physics.
Godo, H et al., "P-9: Numerical Analysis on Temperature Dependence of Characteristics of Amorphous In—Ga—Zn-Oxide TFT," SID Digest '09 : SID International Symposium Digest of Technical Papers, May 31, 2009, pp. 1110-1112.
Godo, H et al., "Temperature Dependence of Characteristics and Electronic Structure for Amorphous In—Ga—Zn-Oxide TFT," AM-FPD '09 Digest of Technical Papers, Jul. 1, 2009, pp. 41-44.
Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.
Hirao, T et al., "Novel Top-Gate Zinc Oxide Thin-Film Transistors (ZnO TFTs) for AMLCDs," Journal of the SID , 2007, vol. 15, No. 1, pp. 17-22.
Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.
Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.
Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda, T et al., "Full-Functional System Liquid Crystal Display Using CG-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, No. 16, pp. 165202-1-165202-22.
Janotti, A et al., "Oxygen Vacancies in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

(56) References Cited

OTHER PUBLICATIONS

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World'S Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "SUFTLA Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 in. QVGA AMOLED Display Using In—Ga—Zn-Oxide TFTs With a Novel Passivation Layer," SID Digest '09 : SID International Symposium Digest of Technical Papers, May 31, 2009, pp. 284-287.

Ihun Song et al.; "Short Channel Characteristics of Gallium-Indium-Zinc-Oxide Thin Film Transistors for Three-Dimensional Stacking Memory"; IEEE Electron Device Letters; Jun. 1, 2008; pp. 549-552; vol. 29, No. 6.

Shoji Shukuri et al.; "A Complementary Gain Cell Technology for Sub-1V Supply DRAMs"; IEDM 92: Technical Digest of International Electron Devices Meeting; Dec. 13, 1992; pp. 1006-1008.

Sanghun Jeon et al.; "180nm Gate Length Amorphous InGaZnO Thin Film Transistor for High Density Image Sensor Applications"; IEDM 10: Technical Digest of International Electron Devices Meeting; Dec. 6, 2010; pp. 504-507.

Wonchan Kim et al.; "An Experimental High-Density DRAM Cell with a Built-in Gain Stage"; IEEE Journal of Solid-State Circuits; Aug. 1, 1994; pp. 978-981; vol. 29, No. 8.

Shoji Shukuri et al.; "A Semi-Static Complementary Gain Cell Technology for Sub-1 V Supply DRAM's"; IEEE Transactions on Electron Devices; Jun. 1, 1994; pp. 926-931.

Tomoyuki Ishii et al.; "A Poly-Silicon TFT With a Sub-5-nm Thick Channel for Low-Power Gain Cell Memory in Mobile Applications"; IEEE Transactions on Electron Devices; Nov. 1, 2004; pp. 1805-1810; vol. 51, No. 11.

Shukuri, S et al., "A Semi-Static Complementary Gain Cell Technology for Sub-1 V Supply DRAM's," IEEE Transactions on Electron Devices, Jun. 1, 1994, vol. 41, No. 6, pp. 926-931.

* cited by examiner set(1) set(2) set(3) set(4)

set(1) set(2) set(3) set(4)
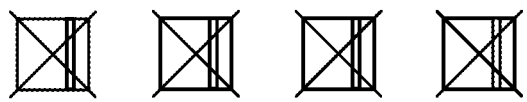

set(1) set(2) set(3) set(4)
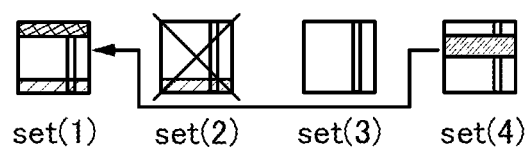
set(1) set(2) set(3) set(4)
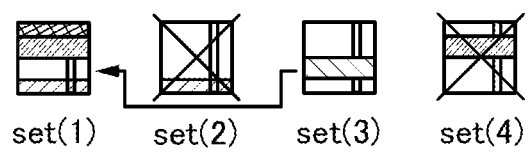
set(1) set(2) set(3) set(4)
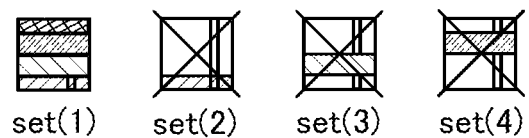
set(1) set(2) set(3) set(4)

SEMICONDUCTOR DEVICE

BACKGROUND OF THE INVENTION

1. Field of the Invention

The present invention relates to a semiconductor device. In particular, the present invention relates to a semiconductor device whose power consumption is reduced by stopping supply of the power supply voltage to a CPU.

In this specification, a semiconductor device generally means a device which can function by utilizing semiconductor characteristics, and an electrooptic device, a semiconductor circuit, and electronic equipment are all semiconductor devices.

2. Description of the Related Art

Most computers currently used are von Neumann computers employing a stored-program system. The stored-program system is such a system that data necessary for arithmetic processing is stored in a memory device outside a CPU and the data is sequentially read out. To improve performance of arithmetic processing, as well as an increase in an operation speed of the CPU, an increase in speed of loading and storing the data between the CPU and the memory device provided outside the CPU is required.

A cache memory has been used to eliminate a speed difference generated between the CPU and the memory device provided outside the CPU so as to achieve high speed data processing. For example, a high-speed cache memory in which data frequently read out to the CPU is stored and a memory device which has high storage capacity are hierarchically arranged such that a location of the cache memory is close to the CPU and a location of the memory device is away from the CPU. With such a structure, an access speed of the CPU can be increased.

It is also possible to arrange a plurality of cache memories hierarchically. The cache memories at different levels are individually called a primary cache (e.g., low capacity of 16 to 64 KB), a secondary cache (e.g., intermediate capacity of 256 to 512 KB), a tertiary cache (e.g., high capacity of 1 to 8 MB), and the like, in the order of level from closest to the CPU to the farthest from the CPU. As the level where cache memory is arranged is closer to the CPU, the used cache memory has lower capacity and operates at higher speed. The memory devices outside the CPU such as a main memory device and an auxiliary memory device are, in many cases, arranged hierarchically.

The cache memory is incapable of storing all data necessary for arithmetic processing of the CPU. The case where necessary data exists in the cache memory is referred to as "cache hit", and the case where the necessary data does not exist in the cache memory is referred to as "cache miss". In the case of a cache miss, it is needed to obtain necessary data from the memory device outside the CPU. Further, when data in the cache memory is updated, the updated data needs to be written back to the memory device outside the CPU. Examples of a method for determining a line in a cache memory which is subjected to rewriting data include a first-in first-out (FIFO) method where the time of storing data is earliest in a cache memory is selected, a least recently used (LRU) method in which a line where the last accessed time is earliest is selected, and the like.

Further, as a control method of update obtained by arithmetic processing of the CPU, a write through method, a write back method, and the like can be given. In the write through method, updated data is stored both in a cache memory and a main memory device at the same time. In other words, even when a line in which the updated data is stored corresponds to a line in which rewriting is performed in the case of cache miss, the updated data is not necessarily written back to the main memory device.

In the write back method, updated data is temporarily stored only in the cache memory. Thus, when a line in which the updated data is stored corresponds to a line in which rewriting is performed in the case of cache miss, the updated data is required to be written back to the main memory device from the cache memory. When the write back method is employed, the frequency of access to the main memory device can be reduced and data processing can be performed at a high rate. Meanwhile, data coherency is not obtained between the cache memory and the main memory device for a certain period of time by employing the write back method. In order to keep data coherency, a dirty bit incorporated in the cache memory can be used.

According to Patent Document 1, write back processing is performed immediately before a CPU enter an idle state, and the idling processing is performed after the write back processing, whereby data coherency is kept and power consumption of the CPU is reduced.

According to Patent Document 2, in the case where the proportion of dirty data in the whole cache data is high, write back processing is performed in such a way that a dirty bit is scanned only when the number of addresses where data is updated exceeds the predetermined number, so that the processing time is reduced.

REFERENCE

Patent Document

[Patent Document 1] Japanese Published Patent Application No. 2002-108702

[Patent Document 2] Japanese Published Patent Application No. 2008-305305

SUMMARY OF THE INVENTION

Supply of a power supply voltage to a CPU is completely stopped for a certain period of time, whereby power consumption of a semiconductor device including the CPU can be reduced. However, the content of data stored in a cache memory is lost at the same time as the stop of power supply. Without consideration of timing, power gating is performed, for example, in a state where access to the cache memory is frequently performed, which causes an extremely lowering of performance of the cache memory.

According to Patent Document 1, by utilizing a transition period during which the CPU enters an idle state, lowering of the cache memory performance is diminished; however, the CPU consumes a certain quantity of power even in the idle state in preparation for generation of a new task.

Thus, it is extremely difficult to completely stop supplying a power supply voltage to the CPU without a decrease in reliability of the semiconductor device including the CPU.

Further, an increase in operation speed and an increase in efficiency are needed for a process of storing of data stored in the cache memory and a process of restoring data stored in the cache memory. The data storing process is performed immediately before supply of the power supply voltage is stopped. The data restoring process is performed after supply of the power supply voltage is resumed.

Thus, it is an object to provide a semiconductor device which consumes less power.

Another object is to provide a semiconductor device in which lowering of performance of a cache memory is diminished and the amount of consumed power is suppressed.

Further, another object is to perform data storing and data restoring efficiently.

The frequency of access to a cache memory is monitored by an arithmetic circuit in a CPU, and the supply of the power supply voltage to the CPU is stopped by a power supply control circuit in accordance with the monitoring results. The power supply control circuit can also stop the supply of the power supply voltage to a memory in the cache memory.

The timing of stopping the supply of the power supply voltage to the CPU may be at a time when a state of the CPU begins to enter an idling state or a time when access to the cache memory is not performed.

The stop of supplying the power supply voltage may start from a memory in a cache memory for which the supply of the power supply voltage is not necessary, and eventually the supply of the power supply voltage to the whole CPU may be stopped.

Alternatively, the stop of supplying the power supply voltage may start from a memory in a cache memory which is accessed less frequently from the CPU, and eventually the supply of the power supply voltage to the whole CPU may be stopped.

One embodiment of the present invention disclosed in this specification is a semiconductor device including a CPU which includes a cache memory including a plurality of dirty bits and an arithmetic circuit, a power supply control circuit which includes a control circuit, and a memory device. The power supply control circuit is configured to allow a power supply voltage to be supplied to the CPU or to stop the supply of the power supply voltage. The dirty bits each show match or mismatch of a first data stored in the cache memory and a second data stored in the memory device. The arithmetic circuit monitors a frequency of access to the cache memory. The control circuit determines a timing in which a stop of supplying the power supply voltage to the CPU is started or a timing in which the stop of supplying the power supply voltage is terminated.

The power supply control circuit may include a setup register configured to set a setting value in accordance with output from the arithmetic circuit and the control circuit.

In the case where the dirty bit shows mismatch of the first data and the second data before supply of the power supply voltage to the CPU is stopped, the first data is stored in the memory device. In the case where the dirty bit shows match of the first data and the second data before supply of the power supply voltage to the CPU is stopped, the second data is stored in the memory device. In the above manner, write back processing is performed on only changed data in the cache memory.

Further, each dirty bit can show match or mismatch of the first data stored in the cache memory and a third data stored in the cache memory.

Further, the cache memory may include a plurality of valid bits which show validity or invalidity of the first data. In the case where the valid bit shows invalidity of the first data and the dirty bit shows mismatch of the first data and the second data, the first data is stored in the memory device.

The CPU may include a nonvolatile latch.

The control circuit may include a timer circuit configured to determine a period during which the supply of the power supply voltage to the CPU is stopped.

It is preferable that the supply of the power supply voltage to the CPU be stopped when a task controlled by an operating system is not executed by the CPU.

A memory in the cache memory may be an n-way set associative cache memory divided into plural sets.

Further, the cache memory may be a direct mapped cache memory, a full-associative cache memory, or the like.

Note that a term "write back processing" in this specification indicates such a process that the write back processing is performed on a specific line.

Further, a term "write back determining processing" in this specification indicates such a process that a line for which write back processing is necessary is determined and the write back processing is performed on only the line.

Further, a term "task" in this specification means an executable unit of a process which is executed by the CPU. For example, the task means a group of instructions consisting of a plurality of instructions executed by the CPU.

According to one embodiment of the present invention, the frequency of access to a cache memory is monitored, and supplying the power supply voltage to a CPU is stopped in the case where the frequency of access is uniform. Alternatively, in the case where the frequency of access is not uniform, the stop of supplying the power supply voltage is performed on memories with a time interval; eventually, the supply of the power supply voltage to the CPU can be stopped. Thus, lowering of performance of the cache memory and lowering of reliability of a semiconductor device can be decreased, and in addition, power consumption of the semiconductor device can be suppressed. Furthermore, with write back processing performed efficiently in accordance with determination of dirty bits, a further reduction in power consumed by the semiconductor device can be achieved.

DETAILED DESCRIPTION OF THE INVENTION

Figure 1:
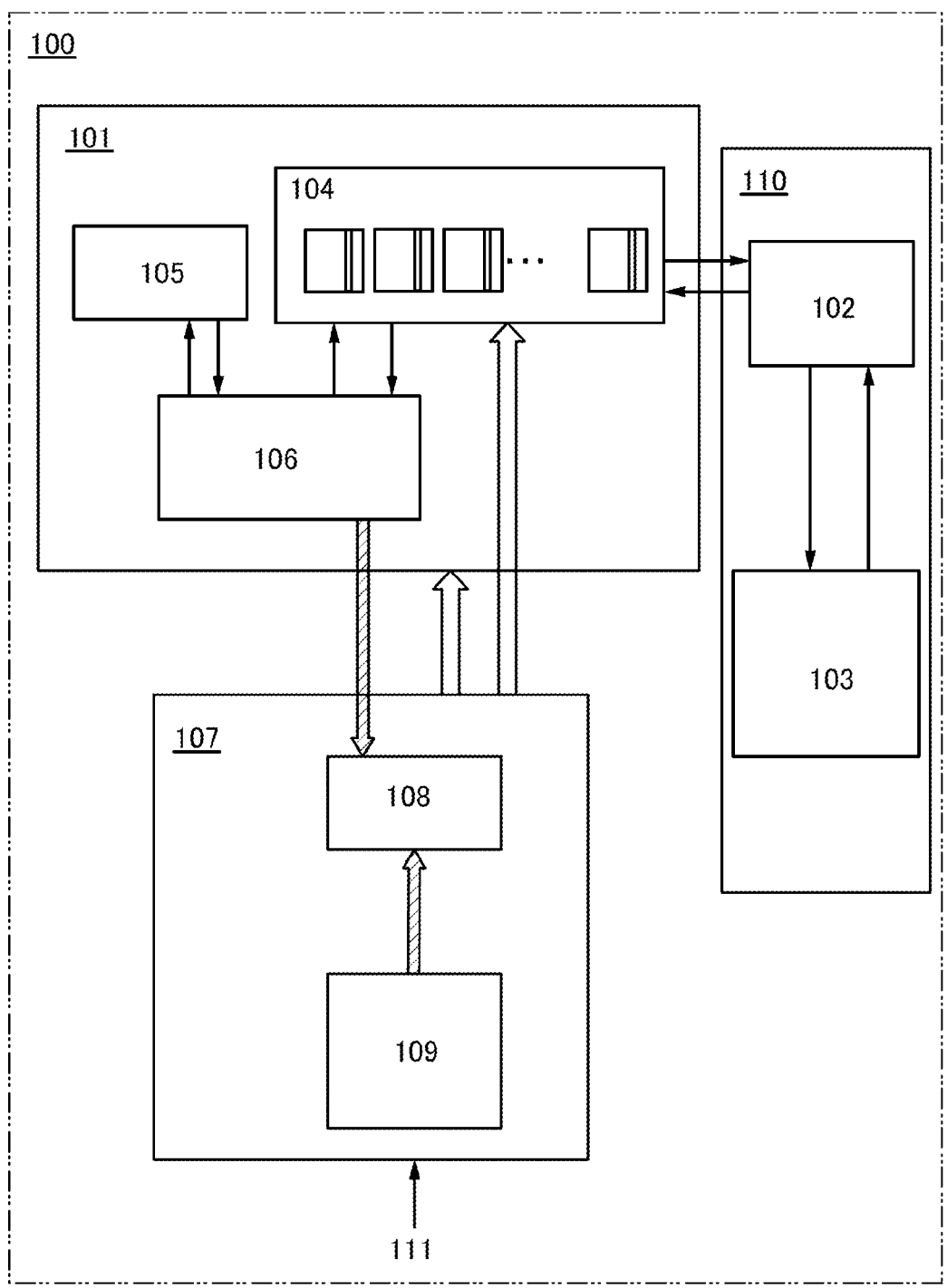
FIG. 1 illustrates a semiconductor device according to one embodiment of the present invention.

Embodiments of the present invention will be described in detail with reference to the accompanying drawings. Note that the present invention is not limited to the description below and it is easily understood by those skilled in the art that the mode and details can be changed in various ways. Therefore, the invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure of a semiconductor device in which an n-way set associative cache memory is used will be described as an example with reference to FIG. 1. In the semiconductor device, the frequency of access to the cache memory is monitored, and with consideration of conditions of the cache memory in accordance with monitoring results, supply of the power supply voltage to the CPU can be stopped by a power supply control circuit. Further, by utilizing determination of a dirty bit in the cache memory, high-efficiency write back processing whose processing time is shortened can be performed.

A semiconductor device 100 includes a CPU 101, a memory device 110, and a power supply control circuit 107. In the CPU 101, a cache memory 104, a register 105, and an arithmetic circuit 106 are provided. In the memory device 110, a main memory device 102 and an auxiliary memory device 103 are provided. In the power supply control circuit 107, a setup register 108 and a control circuit 109 are provided.

Data necessary for arithmetic processing and the like of the CPU 101 is stored in any of the register 105, the cache memory 104, or the memory device 110. The n-way set associative cache memory includes a plurality of sets, and each set has a plurality of lines.

In write back processing, data stored in one line in the cache memory 104 may be stored directly into the memory device 110 or may be stored into another set or another line first and then stored into the memory device 110.

In the CPU 101, instructions (data) stored in the cache memory 104 and the register 105 are read out, and corresponding processing (such as arithmetic processing) is executed by the arithmetic circuit 106.

The arithmetic circuit 106 allows data to be stored or read out into/from the cache memory 104, the register 105, and the setup register 108. In addition, the arithmetic circuit 106 monitors the frequency of access to the cache memory 104 and outputs a setting value based on the monitoring results to the setup register 108. The monitoring results indicate, for example, uniformity of the frequency of access to the memory, history including high or low frequency of use of the cache memory, and the like.

Note that there is no particular limitation on a structure of the arithmetic circuit 106. The arithmetic circuit 106 may be provided with a monitor circuit for monitoring the cache memory 104 constantly.

In the case where data does not exist in the cache memory 104, the CPU 101 accesses the main memory device 102 and the auxiliary memory device 103 in this order, so that data stored in the memory device can be obtained.

The power supply control circuit 107 allows supply of a power supply voltage 111 to the CPU 101 or stop of the supply thereof in accordance with a setting value written into the setup register 108. In addition, the power supply control circuit 107 also allows supply of the power supply voltage 111 to the memory in the cache memory 104 or stop of the supply thereof. The stop of the supply of the power supply voltage to the memory in the cache memory can be conducted on a memory which is used less frequently or accessed less frequently or a memory for which supplying the power supply voltage is not necessary. Detailed description will be made later.

The setup register 108 controls operation of the power supply control circuit 107. The setting value for controlling operation is set by the arithmetic circuit 106 and the control circuit 109 and written into the setup register 108. The setting value is set in accordance with the frequency of access to the cache memory. Note that the power supply control circuit can be controlled in various patterns in accordance with the setting value. In this embodiment, as specific examples of operation of the power supply control circuit, three patterns are described. A first pattern is described. In a case where there is no access to the cache memory or there is not difference in the frequency of access between the sets or the lines in the cache memory, the power supply control circuit immediately stops the supply of the power supply voltage to the CPU. A second pattern is described. In a case where there is a difference in the frequency of access, the power supply control circuit stops the supply of the power supply voltage to sets in the cache memory at the same time, other than a set which is accessed at the highest frequency, and eventually to stop the supply of the power supply voltage to the CPU. A third pattern is described. In a case where there is a difference in the frequency of access, the power supply control circuit starts stopping the supply of the power supply voltage to sets in the cache memory sequentially, from a set whose access frequency is low, and eventually to stop the supply of the power supply voltage to the CPU. Detailed description will be made later.

Note that the setting value written to the setup register is not limited to the above; the setting value can be changed as appropriate in accordance with conditions of the CPU, the frequencies of use of and access to the cache memory, the size of the cache memory, presence of application, and the like.

The control circuit 109 determines a timing in which supply of the power supply voltage 111 to the CPU 101 and the memory in the cache memory 104 or stop of the supply thereof is conducted, a memory in the cache memory 104 which is first subjected to stop of the supply of the power supply voltage 111, a length of period where the supply is stopped, and the like. Then, the control circuit 109 outputs the setting value to the setup register 108.

Note that there is no particular limitation on a unit which supplies the power supply voltage 111 to the power supply control circuit 107. Known AC adapters, batteries, and the like can be used.

There is no particular limitation on a timing in which supply of the power supply voltage to the CPU 101 and the memory in the cache memory 104 or stop of the supply thereof is performed.

There is no particular limitation on the length of a period where the supply is stopped. The length may be calculated with a task scheduling function included in a basic program. It is preferable to calculate the length such that performance of the arithmetic processing of the CPU is not affected. As the length of a period where the supply is stopped is increased, the amount of power consumption of the semiconductor device can be reduced.

The control circuit 109 has a function of measuring the period where supplying the power supply voltage is stopped. A measure function is not particularly specified. A timer circuit may be used for the measure function.

Further, the control circuit 109 may be controlled by a circuit having a function of detecting presence of new task or the like. For example, in the case where new task is not detected by the circuit, the supply of the power supply voltage may be stopped. In the case where new task is detected by the circuit, the supply of the power supply circuit may be resumed.

Examples of the circuit having a function of detecting presence of new task include a circuit which detects an interrupt signal from peripheral equipment. The circuit detects an interrupt signal generated by an input device such as a keyboard, a pointing device, or a touch panel when the input device is driven.

In the memory device 110, the main memory device 102 and the auxiliary memory device 103 are hierarchically arranged. Between the cache memory 104 and the memory device 110, mutual access is regularly performed in order to keep data coherency. Note that in one embodiment of the present invention, data which has been in the cache memory 104 at a time immediately before stop of the supply of the power supply voltage to the CPU is stored in the memory device 110 immediately after stop of the supply of the power supply voltage to the CPU.

In the register 105, an arithmetic result which is to be used instantly is stored temporarily. Further, address of data needed for arithmetic processing, operation conditions of the peripheral equipment, and the like are stored. In the register 105, a semiconductor memory which can access the CPU at a high rate is preferably used. Further, in the register 105, a nonvolatile memory which can hold data even when the supply of the power supply voltage to the CPU is stopped is preferably used, which enables the arithmetic processing after resuming the supply of the power supply voltage to restart from a state immediately before stopping the supply of the power supply voltage to the CPU, with use of data which has been stored immediately before the stop.

Specifically, a nonvolatile latch, a nonvolatile register, and the like can be given. To the nonvolatile latch and the nonvolatile register, known structures can be applied (see Embodiment 5). As an example, transistors in the nonvolatile latch and the nonvolatile register can include an oxide semiconductor.

The cache memory 104 temporarily stores part of a program executed by the CPU 101, part of data needed for arithmetic processing, and the like. The cache memory 104 is preferably provided so as to be accessed from the CPU 101 at a high rate. A semiconductor memory which can access the CPU at a high rate is preferably used. Specifically, a static random access memory (SRAM) including a flip-flop circuit, or the like can be given (see Embodiment 3).

The main memory device 102 temporarily stores part of a program and data used in the arithmetic circuit 106 or the like. In the main memory device 102, a volatile memory which has higher capacity than the cache memory 104 is preferably used. Specifically, a dynamic random access memory (DRAM), a magnetoresistive random access memory (MRAM), or the like can be given (see Embodiment 3).

In the auxiliary memory device 103, a nonvolatile memory which has higher capacity than the main memory device 102 and can hold data for a long time is preferably used. Specifically, a hard disk drive (HDD), a flexible disk drive, an optical disk drive, and the like can be given. Note that storing the program, data, or the like from the auxiliary memory device 103 to the main memory device 102 is controlled by a basic program (OS: operating system) executed by the CPU 101.

Figure 14A:
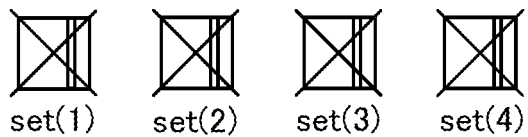
FIGS. 14A to 14C show an example of operation of a power supply control circuit.
Figure 14B:
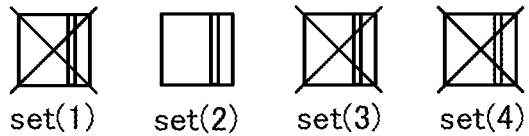
Figure 14C:
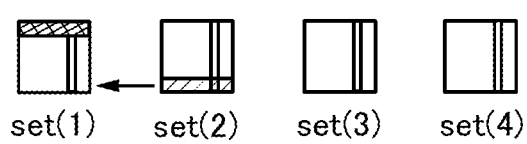

Next, with schematic views in FIGS. 14A to 14C, operation of the power supply control circuit is described. As specific examples of operation of the power supply control circuit, three patterns are described. As described above, in a semiconductor device according to one embodiment of the present invention, the frequency of access to a cache memory is monitored, and with consideration of conditions of the cache memory in accordance with the monitoring results, supply of the power supply voltage to the CPU can be stopped by the power supply control circuit. Further, by the power supply control circuit, supply of the power supply voltage to a memory in the cache memory can be stopped.

FIGS. 14A to 14C show a 4-way set associative cache memory including four sets (set(1) to set(4)). Each set includes four lines (line(1) to line(4)).

An arithmetic circuit in the CPU can monitor the frequency of access to the cache memory. Specifically, in the case of the 4-way set associative cache memory shown in FIGS. 14A to 14C, the arithmetic circuit can monitor the frequency of access to each of the four sets and the frequency of access to each of the four lines.

FIG. 14A shows a case where supplying the power supply voltage to the four sets (set(1) to set(4)) is concurrently stopped. In this case, the power supply control circuit stops the supply of the power supply voltage to the CPU and the cache memory at the same time.

When there is no task which the CPU should execute or there is no access to the cache memory as in the case where the CPU is in an idle state, supplying the power supply voltage is preferably stopped with respect to the four sets at the same time.

Also when the frequency of access is uniform between the four sets, supplying the power supply voltage is preferably stopped on the four sets at the same time.

FIG. 14B shows a case where stop of supplying the power supply voltage is performed on the set(1), the set(3), and the set(4) at the same time. This case is that the frequency of access is not uniform among the four sets and that the set which is accessed most frequently can be identified. In this case, stop of supplying the power supply voltage is performed at the same time on the sets (the set(1), the set(3), and the set(4)) except the set(2) which is accessed most frequently, and eventually, supplying the power supply voltage to the CPU is preferably stopped. Note that when the access frequency from the CPU to the set(2) is extremely higher than those to the set(1), the set(3), and the set(4), operation of the power supply control circuit is preferably controlled in the above manner.

As in FIG. 14B, the set(2) which is accessed from the CPU most frequently is extracted, and the set(2) is driven, whereby lowering of performance of the cache memory can be reduced. Note that the preferred driving time of the set(2) is such that the performance of the cache memory can be maintained.

In this case, for a while before the supply of the power supply voltage to the CPU can be stopped, arithmetic processing can be performed in a state where the CPU consumes less power than at least in a state where all of the four sets are driven. Further, the set(2) which is accessed from the CPU most frequently is driven, which leads to a reduction in lowering of the performance of the cache memory and a reduction in power consumption.

The data storing is performed as follows: data of the set(1), the set(3), and the set(4) are stored in the memory device immediately before the supply of the power supply voltage to the above sets is stopped. After that, the set(2) is driven for a while. Immediately before the supply of the power supply voltage to the set(2) is stopped, data of the set(2) is stored in the memory device.

FIG. 14C shows a case where stop of supplying the power supply voltage is performed first on a set which is accessed from the CPU less frequently or a set for which a supply of the power supply voltage is not necessary, and the stop thereof is sequentially performed on the other sets (i.e., performed sequentially on the sets in the ascending order of access frequency or necessity for supply of the power supply voltage). Needless to say, also in this case, the frequency of access is not uniform between the four sets.

First, data stored in the line(4) whose frequency of access is the highest in the set(2) which is accessed from the CPU at the lowest frequency in the cache memory is temporarily stored in the line(4) in the set(1) in the same cache memory. In this case, it is preferable that data stored in the line(4) in the set(2) be accessed from the CPU at higher frequency than the data stored in the line(4) in the set(1).

After that, supplying the power supply voltage to the set(2) is stopped.

Next, data stored in the line(2) whose frequency of access is the highest in the set(4) is once stored in the line(2) in the set(1) in the same cache memory. Here, the frequency of access to the set(4) is higher than that to the set(2). In this case, it is preferable that the data stored in the line(2) in the set(4) be accessed from the CPU at higher frequency than the data stored in the line(2) in the set(1).

After that, supplying the power supply voltage to the set(4) is stopped.

Next, data stored in the line(3) whose frequency of access is the highest in the set(3) is once stored in the line(3) in the set(1) in the same cache memory. Here, the frequency of access to the set(3) is higher than that to the set(4). In this case, it is preferable that the data stored in the line(3) in the set(3) be accessed from the CPU at higher frequency than the data stored in the line(3) in the set(1).

After that, supplying the power supply voltage to the set(3) is stopped.

As in FIG. 14C, the set(1) which is accessed from the CPU most frequently is extracted, a line whose frequency of access is higher than the lines in the set(1) is found from the lines in each of the set(2), the set(3), and the set(4), and data stored in the line with high frequency is once stored in the set(1), whereby the frequency of access to the set(1) can be increased.

Further, supplying the power supply voltage to the sets (the set(2), the set(3), and the set(4)) other than the set(1) is stopped, so that the sets take a pause, and the set(1) is driven for a while. In this manner, the performance of the cache memory is maximized, and power consumption of the semiconductor device can be reduced.

Immediately before supplying the power supply voltage to the set(1) is stopped after the set(1) is driven for a while, the data in the set(1) is stored in the memory device. Note that the preferred driving time of the set(1) is such that the performance of the cache memory can be maintained.

In the above manner, data stored in one line of one set in the cache memory 104 may be once stored in a corresponding line in another set, and then eventually stored in the memory device.

In the case of FIG. 14C, supplying the power supply voltage to the most frequently used set is not stopped until the supply of the power supply voltage to the CPU is stopped. Thus, the efficiency of access to the cache memory is increased, and power consumption can be reduced.

Figure 2:
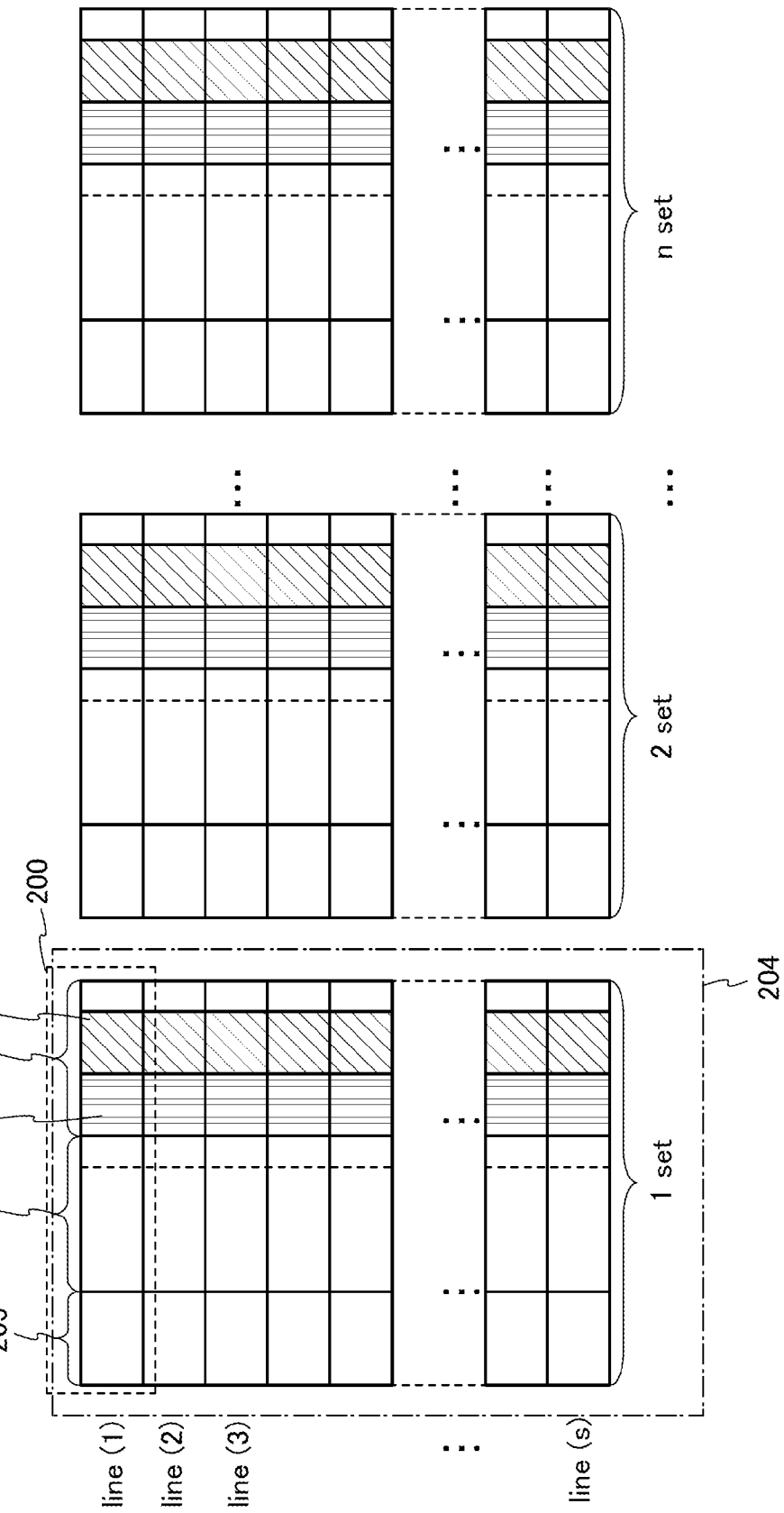
FIG. 2 illustrates a semiconductor device according to one embodiment of the present invention.

FIG. 2 illustrates an example of a structure of the cache memory 104 according to one embodiment of the present invention.

Although an n-way set associative cache memory is used as the cache memory 104 as an example in this embodiment, a direct mapped cache memory, a full-associative cache memory, or the like can be used. In an n-way set associative cache memory, n (n is a natural number of two or more) sets each of which is provided with s (s is a natural number of two or more) lines in each of which data of one address is stored are used.

The cache memory 104 includes n sets 204. Each of the sets 204 includes s lines (line(1) to line(s)). Each line 200 has a flag region 207 including a valid bit 201 and a dirty bit 202, a data region 203, and a tag region 205.

The data region 203 is a region where data necessary for a program, arithmetic processing, and the like are stored. For example, in the case where data stored at one address of the main memory device (or an auxiliary memory device) is stored in a data region in a line corresponding to the address, data stored in the data region in the line and data stored in the address agree with each other.

The tag region 205 is a region where an address corresponding to data stored in the data region 203 is stored.

The flag region 207 includes at least the valid bit 201 and the dirty bit 202 and shows an attribute of data stored in the data region 203 in the line 200.

The valid bit 201 shows whether the data stored in the data region 203 in the line 200 is valid or invalid.

In this specification, the expression "data of the valid bit 201 is Data A (e.g., "0")" means that data stored in the data region 203 in the line 200 is invalid. For example, the above indicates a state before data of one address of a memory device outside the CPU 101 is stored in the data region 203 in the corresponding line 200, or the like. When data is read out from the line where data of the valid bit 201 is Data A, cache miss occurs.

In this specification, the expression "data of the valid bit 201 is Data B (e.g., "1")" means that data stored in the data region 203 in the line 200 is valid. In other words, when data stored in the data region 203 in the line where data of the valid bit 201 is Data B agrees with an address which the CPU 101 requests, cache hit occurs. In this case, the CPU 101 can progress arithmetic processing with use of data stored in the data region 203 in the line.

Note that in the semiconductor device 100 according to one embodiment of the present invention, data of all the valid bits are set to Data A when supply of the power supply voltage to the CPU 101 is resumed (see Embodiment 2). As an example, a latch having a reset function may be used for a memory device storing data corresponds to the valid bit, and data correspond to all the valid bits may be reset when supply of the power supply voltage to the CPU is resumed. With such a structure, restart of arithmetic processing of the CPU is promptly performed as described later, and a period during which supply of the power supply voltage to the CPU is stopped can be extended for a long time.

Further, the valid bit 201 is preferably a nonvolatile memory device.

The dirty bit 202 shows whether the data stored in the data region 203 in the line 200 is changed or not. In other words, the dirty bit 202 shows whether or not data stored in the line agrees with data stored at an address in the main memory device, which corresponds to the line. Note that in this specification, only when data of the valid bit is Data B, determination by the dirty bit 202 can be utilized. Thus, in the case where data of the valid bit is Data B and data of the dirty bit is set to Data C, data in the line is changed. On the other hand, in the case where data of the valid bit is Data B and data of the dirty bit is set to Data D, data in the line is not changed.

The expression "data of the dirty bit 202 is set to Data C (e.g., "1")" means that after data from the memory device outside the CPU 101 is stored in the data region 203 in the line 200, the data is changed. In other words, the above indicates that data stored in the data region 203 and data at a corresponding address in the memory device outside the CPU do not agree with each other.

The expression "data of the dirty bit 202 is set to Data D (e.g., "0")" means that after data from a memory device outside the CPU 101 is stored in the data region 203 in the line 200, the data is not changed. In other words, the above indicates that data stored in the data region 203 and data at a corresponding address in the memory device outside the CPU agree with each other.

Figure 3:
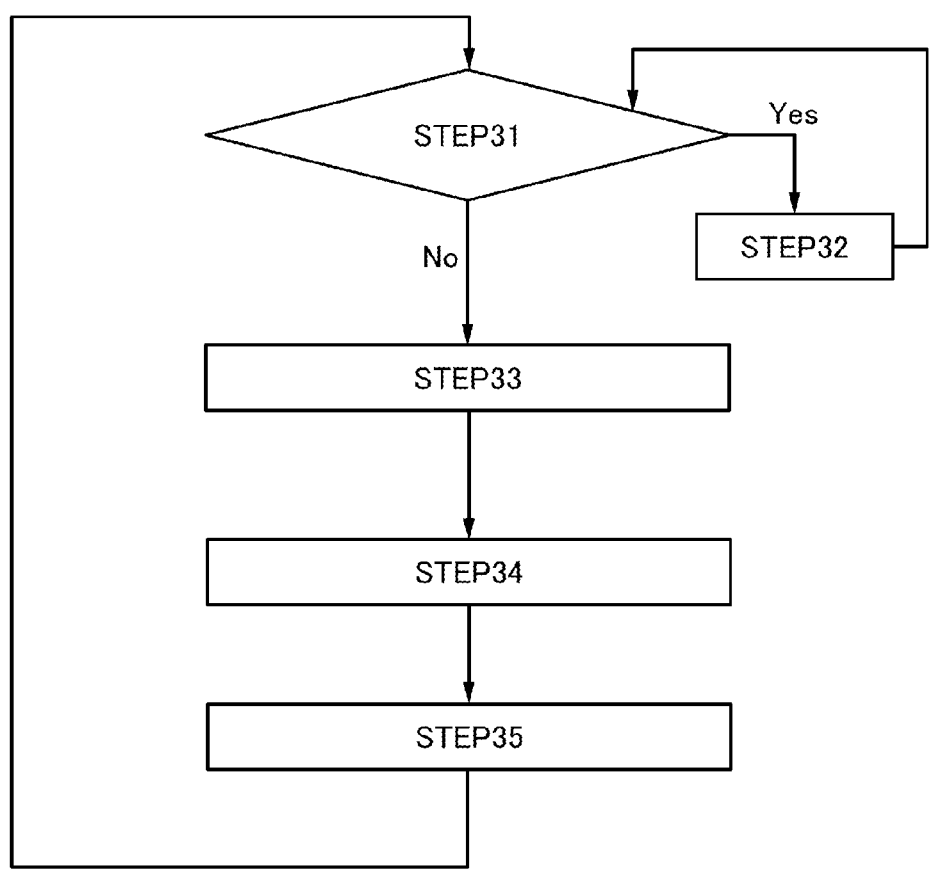
FIG. 3 is a flow chart showing a case where an executable task does not exist.

FIG. 3 is a flow chart showing a case where supplying the power supply voltage to the CPU 101 is stopped in the semiconductor device 100.

In one embodiment of the present invention, data storing is efficiently performed just before the supply of the power supply voltage to the CPU 101 is stopped, and a processing time necessary for restoring data after resuming the supply of power is shortened, so that a period during which the supply of the power supply voltage to the CPU is stopped is made longer, and thus power consumption in the semiconductor device 100 can be reduced.

There is no particular limitation on a timing in which supply of the power supply voltage to the CPU 101 is stopped. Basically, it is preferable to stop the supply of the power supply voltage when an executable task does not exist.

In a step 31, determination whether an executable task exists or not is performed. The step 31 is preferably controlled by a basic program (operating system: OS) executed by the CPU 101. Specifically, existence of an executable task is managed by the scheduling function of a task included in a basic program. Note that the case "an executable task does not exist" includes a case where an executable task does not exist for a certain period. In the case where the determination shows that an executable task exists (Yes), the flow goes into a step 32, and the task is executed. In the case where the determination shows that there is no executable task (No), the flow goes into a step 33.

In the step 32, the CPU 101 executes the task. After the task is completed, the flow returns to the step 31.

In the step 33, immediately before stop of the supply of the power supply voltage to the CPU 101, write back processing is performed on the cache memory 104. The step 33 is preferably executed in accordance with an instruction dedicated to write back processing of the CPU 101.

When the supply of the power supply voltage to the CPU 101 is stopped, it is necessary to perform such processing as to keep data coherency in the cache memory 104 in the CPU 101 and data in the main memory device 102 or the auxiliary memory device 103 outside the CPU. By the write back processing in the step 33, data in the cache memory 104 can agree with the data in the main memory device 102 or the auxiliary memory device 103 outside the CPU.

In a step 34, after the write back processing, the supply of the power supply voltage to the CPU 101 is stopped. Note that in the case where the register 105 is a nonvolatile register, data stored in the register 105 can be held even when the supply of the power supply voltage to the CPU is stopped.

Processing in the step 34 is executed by the power supply control circuit 107. Specifically, the power supply control circuit 107 executes processing in the step 34 under the conditions where operation of the power supply control circuit 107 is controlled in accordance with a setting value which is determined by the control circuit 109 and the arithmetic circuit 106 and written to the setup register 108.

In a step 35, supply of the power supply voltage to the CPU 101 is resumed. Processing in the step 35 is executed by the power supply control circuit 107 as in the processing in the step 34.

As described above, supplying the power to the CPU 101 is stopped in a period where an executable task does not exist, whereby power consumption of the semiconductor device 100 can be reduced without lowering of arithmetic performance of the CPU 101.

After the step 35, the flow returns to the step 31.

In the step 35, immediately after the supply of the power supply voltage to the CPU is resumed, data of all the valid bits is collectively set to Data A (refer to Embodiment 2). By the setting, the supply of the power supply voltage to the CPU is resumed, and when the CPU restarts arithmetic processing, data of all the valid bits becomes Data A. Since data at a time immediately before the supply of the power supply voltage to the CPU is stopped is stored in the register 105 in the CPU (such as a nonvolatile register or a flip-flop included in a pipeline), CPU can execute the subsequent instruction of data at a time immediately before the stop of supplying power supply voltage. In the setting where data of all the valid bits is set to Data A, cache miss frequently occurs in a short time after the supply of the power supply voltage to the CPU is resumed. However, while instructions and data necessary for arithmetic processing executed immediately after resuming the supply of the power supply voltage are gradually stored in the cache memory, the arithmetic processing can be restarted. Thus, the effective processing time is short and efficient as compared with the case where arithmetic processing is not restarted until all data in the cache memory is restored.

A length of a period from the step 34 to the step 35, that is, a length of period during which the supply of the power supply voltage to the CPU 101 is stopped may be set by a timer circuit included in the semiconductor device 100. The steps can be progressed in such a way that a length of a certain period is timed by the timer circuit during execution of the step 34, and then, the step 35 starts.

The step 35 can be executed even when a new task is generated after the step 34. Note that presence of a new task generated after the step 34 can be confirmed by the control circuit 109.

According to the above flow chart, a period during which the supply of power supply voltage to the CPU is stopped can be set to be longer. Accordingly, power consumption of the semiconductor device can be suppressed. Further, supplying the power supply voltage is stopped in a period where there is no task that should be executed by the CPU, whereby power consumption of the semiconductor device can be reduced without a decrease in a net operation speed of the arithmetic processing executed by the CPU.

Figure 4:
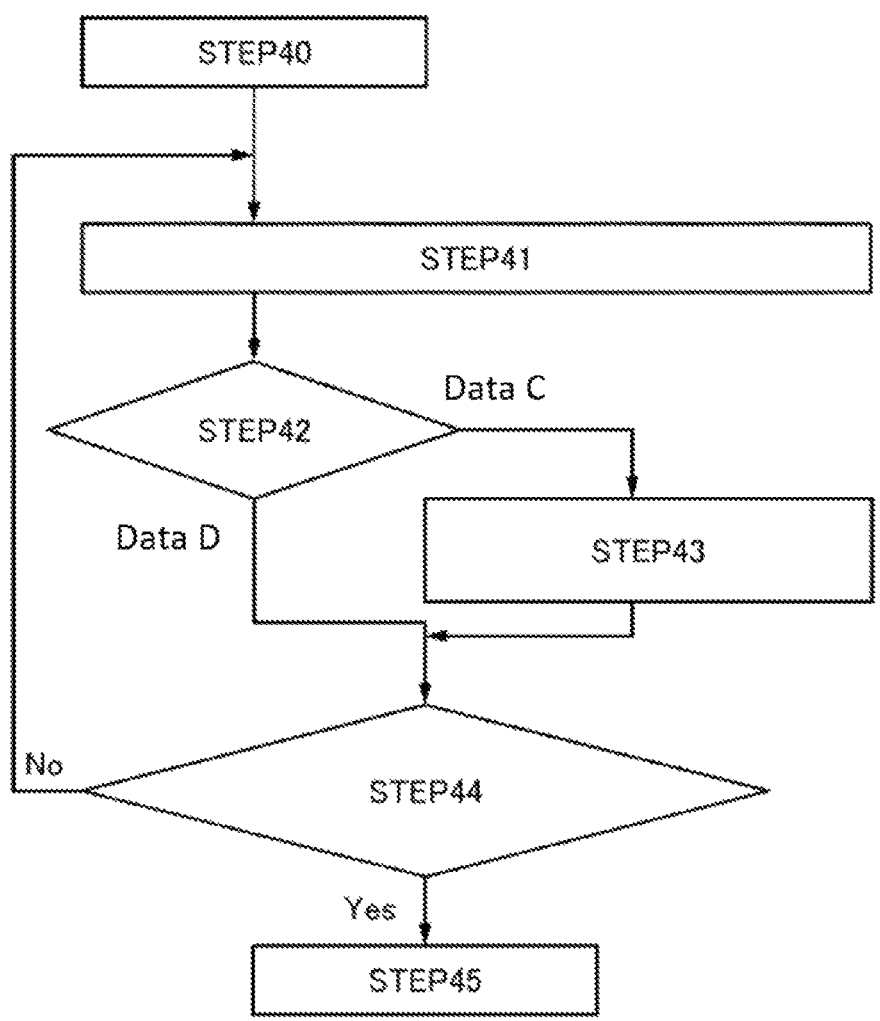
FIG. 4 is a flow chart showing write back determining processing.

FIG. 4 shows a flow chart of write back determining processing performed immediately before the supply of the power supply voltage to the CPU 101 is stopped. By efficient data storing, power consumption of the semiconductor device can be reduced.

In a step 40, the write back determining processing starts.

In a step 41, a dirty bit and a valid bit for first one line are read out. In the case where data of the valid bit is Data B (the case where data stored in the data region is valid), the flow goes into a step 42. Only on the line where data of the valid bit is Data B, determination whether data of the dirty bit is Data C or Data D is conducted. In the case where data of the valid bit is Data A, data stored in the line where data of the valid bit is Data A is invalid; thus, the flow does not go into the step 42 but goes into determination of the next line, that is, into the step 41 again. The step 41 is preferably executed by a dedicated instruction of the CPU 101.

In the step 42, determination whether data of the dirty bit is Data C or Data D is conducted on the basis of a logical state of the dirty bit (e.g., "1" indicates Data C, "0" indicates Data D, and the like).

In the case where the determination shows the dirty bit is Data C according to the step 42, data stored in the data region in the line is changed. Accordingly, in a step 43, data stored in the data region in the line is stored at a corresponding address of the memory device outside the CPU (e.g., the main memory device 102, or the auxiliary memory device 103, or the like). In other words, write back processing of the line is performed. The step 42 is preferably executed by a dedicated instruction of the CPU 101.

Note that it is preferable that the valid bit be a nonvolatile memory and data of the valid bit in each line be set to Data A. In the setting where data of the valid bit is set to Data A, the arithmetic processing of the CPU can restart at high speed when the supply of the power supply voltage to the CPU is resumed. Note that a timing in which data of the valid bit is set to Data A can be set as appropriate, for example, a time after the step 41, a time after the step 42, a time after the step 43, or the like.

In the case where the determination shows that the dirty bit is Data D according to the step 42, data stored in the data region in the line is not changed. Thus, the flow goes into a step 44.

In the step 44, determination whether the write back determining processing in all lines is finished or not is conducted.

In the case where the determination shows that there is a line in which the write back determining processing is not finished (No) according to the step 44, the flow returns to the determination in the step 41.

In the case where the determination shows that the write back determining processing is finished in all lines (Yes) according to the step 44, the flow goes into a step 45. In other words, the write back determining processing is finished in all lines.

After the write back determining processing is finished in all lines, in the step 45, supply of the power supply voltage to the CPU is stopped.

In the above, the write back processing is conducted only on data stored in the data region in a line where data of the dirty bit is Data C, which is more efficient than the case where the write back processing is conducted on data stored in the data regions in all lines. A processing time necessary for storing of data immediately before the supply of the power supply voltage to the CPU is stopped is shortened, so that a period during which supplying power is stopped can be made longer. Thus, power consumption of the semiconductor device can be reduced.

As for data stored in the data region in a line where data of the dirty bit is Data D, the same data is left at a corresponding address in a memory device outside the CPU. Thus, coherency between data stored in the cache memory immediately before the supply of the power supply voltage to the CPU is stopped and data stored in the memory device outside the CPU can be kept. Accordingly, even after supply of the power supply voltage to the CPU is resumed, continuity of the arithmetic processing can be maintained.

Figure 5:
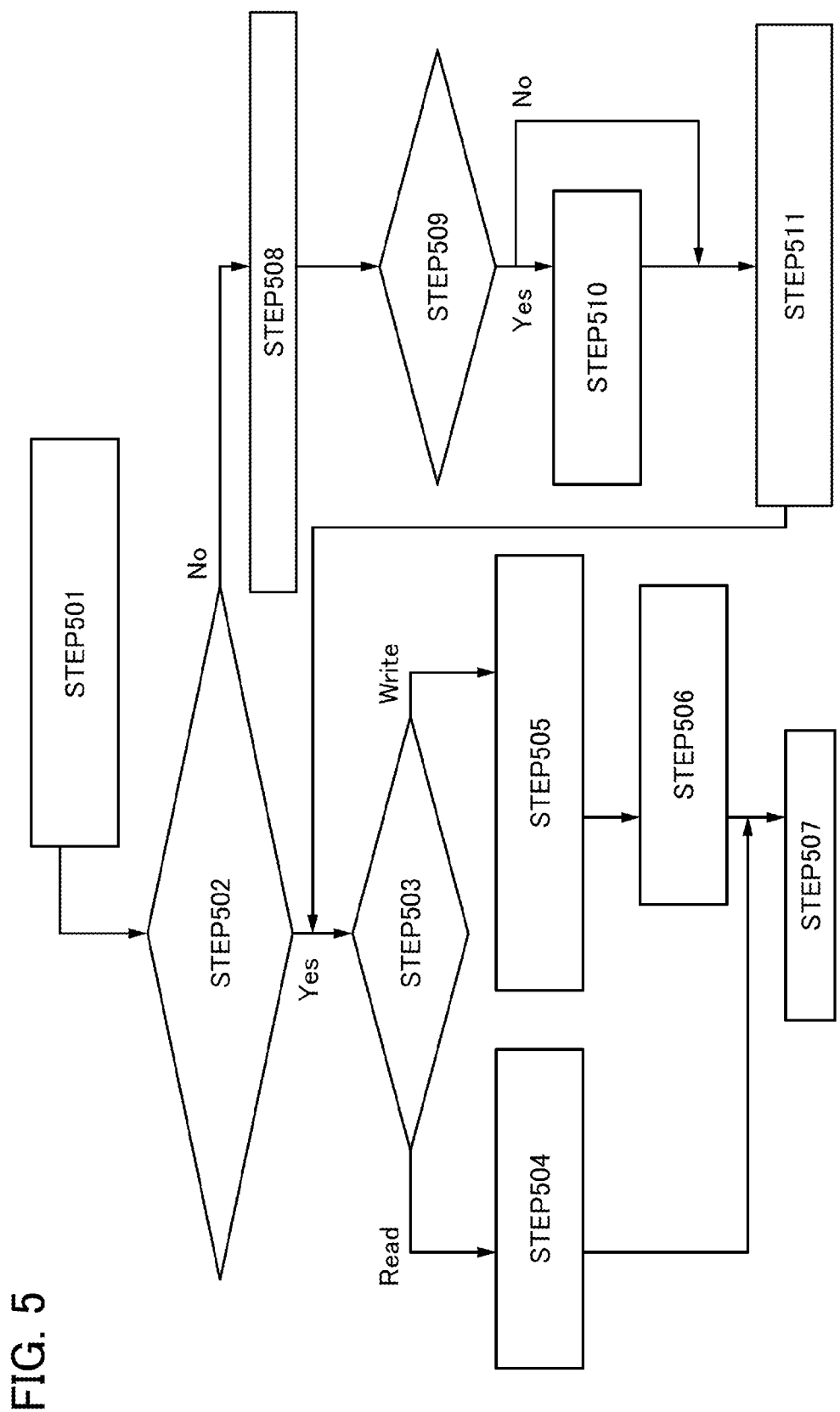
FIG. 5 is a flow chart showing a case where an executable task exists.

FIG. 5 is a flow chart showing a state where a task is executed in the semiconductor device 100.

In a step 501, reading or writing from/into an address is requested from the CPU.

In a step 502, whether or not data of the address exists in the cache memory 104 is determined. Specifically, tag data stored in the tag region in the line corresponding to the address is read out, and the data of the address and the tag data are compared to each other.

In the case where the data of the address exists in the cache memory 104 (Yes) according to the determination in the step 502, the flow goes into determination in a step 503. Specifically, such a case indicates that the data of the address agrees with the tag data.

In the determination in the step 503, either reading or writing is determined.

In the case where reading is determined according to the determination in the step 503, the flow goes into a step 504. In the step 504, data in the cache memory 104 is transferred to the CPU. Specifically, data stored in the data region in the line is read out, and the CPU obtains the data. Then, the flow goes into a step 507. In the step 507, request from the CPU is waited.

Further, in the case where writing is determined according to the determination in the step 503, the flow goes into a step 505. In the step 505, data in the cache memory 104 is changed into data obtained from the CPU. Specifically, data obtained from the CPU is stored in the data region in the line.

In a step 506, the dirty bit is set in the line.

Then, the flow goes into the step 507, and the step 507 is in a state of waiting for a request from the CPU.

Further, according to the determination in the step 502, in the case where the data of the address does not exist in the cache memory 104 (No), the flow goes into a step 508.

In the step 508, a line in the cache memory 104, in which data stored at a corresponding address of the memory device outside the CPU is refilled, is selected. Then, whether the line is dirty or not is determined. Specifically, the determination is conducted by the dirty bit.

In the case where the line is dirty (Yes) according to determination in a step 509, the flow goes into a step 510.

In the step 510, data in the line is written back to the corresponding address of the memory device outside the CPU. The data in the line is written to the memory device.

In the case where the line is not dirty (No) according to the determination in the step 509, the flow goes into a step 511.

In the step 511, the amount of data which is stored in the line in the cache memory 104 is read out from a corresponding address of the memory device outside the CPU and written into the line.

Then, the flow goes into the determination in the step 503.

This embodiment can be freely combined with any of the other embodiments in this specification.

Embodiment 2

As described in Embodiment 1, in the semiconductor device according to one embodiment of the present invention, data of all the valid bits is set to Data A when supply of the power supply voltage to the CPU is resumed. Immediately after the supply of the power supply voltage to the CPU is resumed by the setting of the valid bits, cache miss frequently occurs. However, while instructions and data necessary for arithmetic processing executed immediately after resuming the supply of the power supply voltage to the CPU are gradually stored in the cache memory, the arithmetic processing can restart. Thus, the arithmetic processing of the CPU can be restarted at high speed as compared with the case where arithmetic processing is not restarted until all data in the cache memory is restored. By shortening the processing time necessary for the CPU to restart the arithmetic processing, a period during which the supply of the power supply voltage is stopped is made longer, and power consumption of the semiconductor device can be reduced.

In this embodiment, a structure example of a valid bit where data of all valid bits can be set to Data A and the setting can be performed at high speed is described with reference to FIGS. 6A and 6B.

Figure 6A:
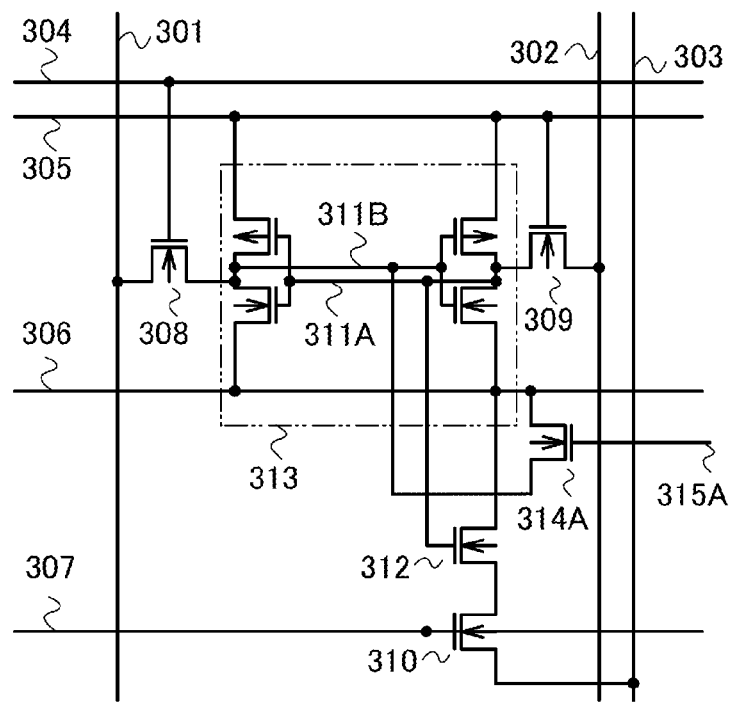
FIGS. 6A and 6B are circuit diagrams each illustrating a configuration of a memory cell.

FIG. 6A is a circuit diagram showing a memory cell configuration of a valid bit in a cache memory in this embodiment. In FIG. 6A, the memory cell includes a power supply line 305, a ground line 306, a word line 304 for writing, a word line 307 for reading, a data line 301 for wiring, a data line 302 for writing, a data line 303 for reading, an n-channel transistor 308, an n-channel transistor 309, an n-channel transistor 310, an n-channel transistor 312, an n-channel transistor 314A, and an inverter circuit 313.

In FIG. 6A, a node formed with a gate electrode of the n-channel transistor 312 is referred to as a node 311A.

A gate electrode of the n-channel transistor 314A is electrically connected to a wiring 315A, one electrode thereof is electrically connected to the ground line 306, and the other electrode thereof is electrically connected to a node 311B. A wiring 315A can control a memory cell of the valid bit. Note that each line has a 1-bit valid bit. When data in the line is Data B (here, "1"), the data stored in the data region is valid. When data in the line is Data A (here, "0"), the data stored in the data region is invalid. While data of the valid bit is set to Data A, the n-channel transistor 314A is turned on, and data of the memory cell becomes "0".

As shown in FIG. 6A, the n-channel transistor 314A is provided in each memory cell of all the valid bits in the cache memory, so that data of all the valid bits can be set to Data A at the same time. Specifically, data of the memory cell is controlled by the wiring 315A which is electrically connected to the gate electrode of the n-channel transistor 314A, so that data of each memory cell of all the valid bits can be "0" at the same time. Thus, setting of data of all the valid bits to Data A is concurrently performed at high speed, so that a processing time necessary for restoring data after resuming the supply of power can be shortened.

Figure 6B:
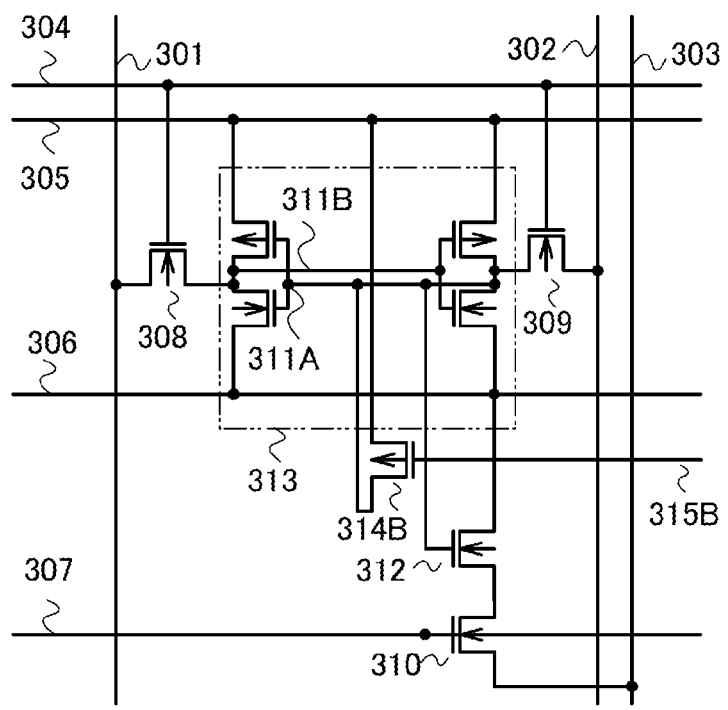

Although the n-channel transistor 314A is used in FIG. 6A, a p-channel transistor 314B may be added to each memory cell as shown in FIG. 6B.

Note that the transistor used in the memory cells shown in FIGS. 6A and 6B may include an oxide semiconductor.

Further, the valid bit may be a nonvolatile memory device.

Figure 7A:
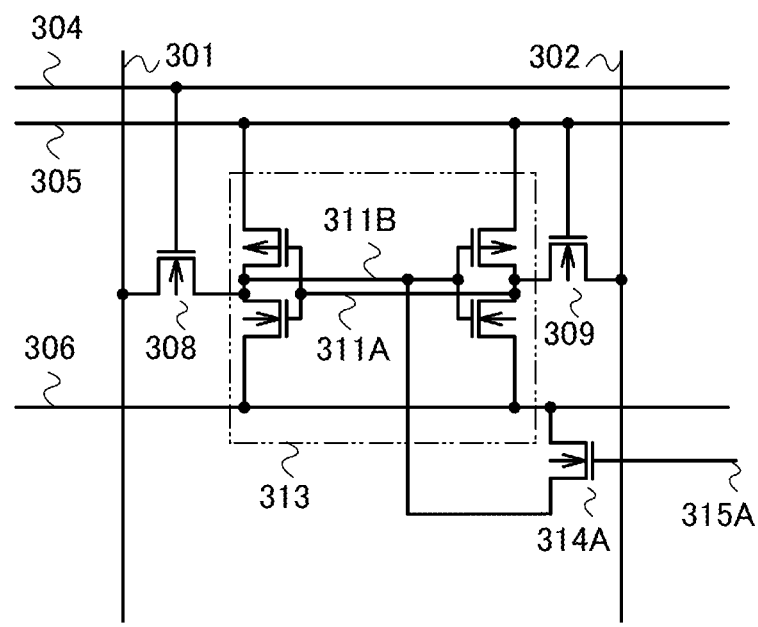
FIGS. 7A and 7B are circuit diagrams each illustrating a configuration of a memory cell.
Figure 7B:
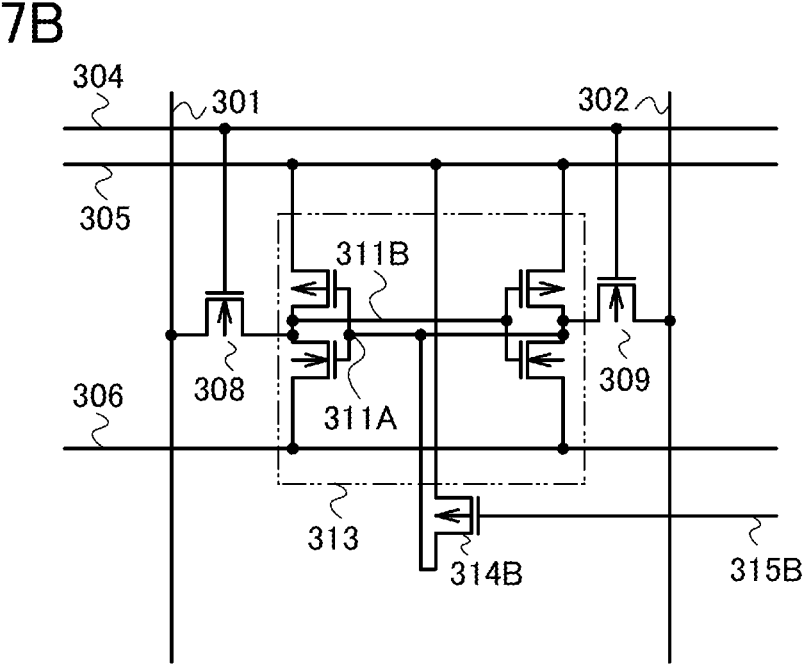

Note that as shown in FIG. 7A, data of all the valid bits can be set to Data A in such a structure that the n-channel transistor 314A is provided in a memory cell in an SRAM. Alternatively, as shown in FIG. 7B, data of all the valid bits can be set to Data A in such a structure that the p-channel transistor 314B is provided in a memory cell in an SRAM.

This embodiment can be freely combined with any of the other embodiments in this specification.

Embodiment 3

In this embodiment, an example of a structure of the cache memory described in Embodiment 1 will be described with reference to FIG. 12A. Specifically, an example in which a cache memory is formed with an SRAM in which a flip-flop circuit is used in a memory portion is described. In addition, an example of a structure of the memory device (e.g., the main memory) outside the CPU described in Embodiment 1 is described with reference to FIG. 12B. Specifically, an example in which a memory device outside the CPU is formed with a DRAM is described.

In a portable information terminal such as a mobile phone, a smartphone, or an electronic book, an SRAM or a DRAM is frequently used so as to store image data or the like temporarily. In a semiconductor device according to one embodiment of the present invention, an SRAM whose access rate is high is preferably used for the cache memory. Further, a DRAM with higher capacitance is preferably used for the main memory device.

Figure 12A:
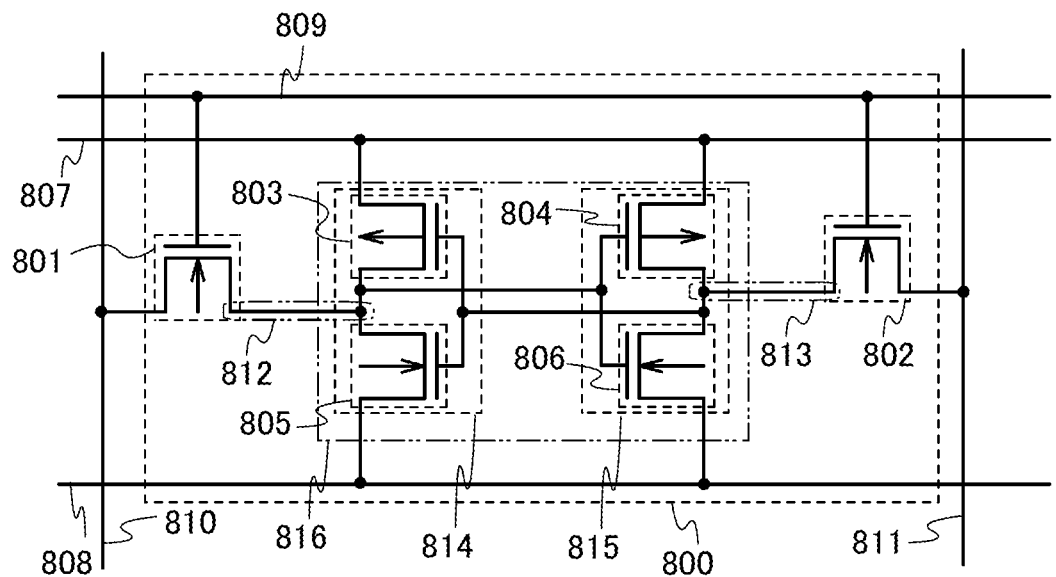
FIGS. 12A and 12B are circuit diagrams illustrating a cache memory and a memory device according to one embodiment of the present invention.

FIG. 12A shows a memory cell 800 included in the cache memory in Embodiment 1. The memory cell 800 includes six transistors (an n-channel transistor 801, an n-channel transistor 802, a p-channel transistor 803, a p-channel transistor 804, an n-channel transistor 805, and an n-channel transistor 806). In addition, a power supply line 807, a ground line 808, a word line 809, a data line 810, a data line 811, a node 812, and a node 813 are included.

An inverter circuit 814 is formed with the p-channel transistor 803 and the n-channel transistor 805. An inverter circuit 815 is formed with the p-channel transistor 804 and the n-channel transistor 806. In the memory cell 800, a flip-flop circuit 816 is formed with these two inverter circuits (a couple of inverter circuits). The flip-flop circuit 816 can keep a stable state by making data correspond to two states of high 'H' and low 'L' and hold 1-bit data (memory content such as data) temporarily One of a source terminal and a drain terminal of the p-channel transistor 803 is electrically connected to the power supply line 807. One of a source terminal and a drain terminal of the p-channel transistor 804 is electrically connected to the power supply line 807. One of a source terminal and a drain terminal of the n-channel transistor 805 is electrically connected to the ground line 808. One of a source terminal and a drain terminal of the n-channel transistor 806 is electrically connected to the ground line 808. A gate terminal of the n-channel transistor 801 is electrically connected to the word line 809, and one of a source terminal and a drain terminal thereof is electrically connected to the data line 810. A gate terminal of the n-channel transistor 802 is electrically connected to the word line 809, and one of a source terminal and a drain terminal thereof is electrically connected to the data line 811.

The other of the source terminal and the drain terminal of the n-channel transistor 801, the other of the source terminal and the drain terminal of the p-channel transistor 803, the other of the source terminal and the drain terminal of the n-channel transistor 805, a gate terminal of the p-channel transistor 804, and a gate terminal of the n-channel transistor 806 are electrically connected, whereby the node 812 is formed.

The other of the source terminal and the drain terminal of the n-channel transistor 802, the other of the source terminal and the drain terminal of the p-channel transistor 804, the other of the source terminal and the drain terminal of the n-channel transistor 806, a gate terminal of the p-channel transistor 803, and a gate terminal of the n-channel transistor 805 are electrically connected, whereby the node 813 is formed.

In the cache memory in this specification, the memory cells 800 can hold data as long as the power supply voltage continues to be supplied to the CPU. Further, as long as the power supply voltage continues to be supplied to some of the memory cells 800, the memory cells 800 can hold data. When the supply of the power supply voltage to the CPU is stopped, data in the memory cell 800 in the cache memory is lost.

Note that the structure of the memory cell may be used as a memory portion of the valid bit described in Embodiments 1 and 2.

Further, the structure of the memory cell may be used as a memory portion of the dirty bit described in Embodiment 1.

According to one embodiment of the present invention, data of all the valid bits in the cache memory is set to Data A immediately after supply of the power supply voltage to the CPU is resumed. Data which has been in the cache memory immediately before the stop of supplying power is lost concurrently with the stop of the supply of the power supply voltage; however, after the setting, data necessary for arithmetic processing can be stored again in the memory cell 800 in the cache memory with use of data stored in the register or the memory device outside the CPU. In the case where the setting is not performed, data in the memory cell 800 at a time immediately after the supply of the power supply voltage is resumed cannot be identified. Thus, restoring data is inefficient as compared with the case where the setting is performed. As a structure in which all the valid bits in the cache memory are set to be invalid concurrently at high speed, Embodiment 2 can be referred to.

Writing operation in the memory cell 800 is described. By setting the word line 809 to 'H', the n-channel transistor 801 (selection transistor) and the n-channel transistor 802 (selection transistor) are turned on, so that electrical continuity is obtained. By setting the data line 810 to 'H' and setting the data line 811 to 'L', the p-channel transistor 803 and the n-channel transistor 805 are supplied with a potential of the data line 811 via the n-channel transistor 802, so that the p-channel transistor 803 is turned on, and the n-channel transistor 805 is turned off. Further, the p-channel transistor 804 and the n-channel transistor 806 are supplied with a potential of the data line 810 via the n-channel transistor 801, so that the p-channel transistor 804 is turned off and the n-channel transistor 806 is turned on. To the node 812, "1" is written, and to the node 813, "0" is written. In the above manner, data is written to the memory cell 800.

A mode of holding memory in the memory cell 800 is described. By setting the word line 809 to 'L', the n-channel transistor 801 (selection transistor) and the n-channel transistor 802 (selection transistor) are turned off, and there is no electrical continuity. Thus, while the power supply voltage is being supplied to the CPU, potentials of the nodes are fixed; "1" at the node 812 and "0" at the node 813 are held. In other words, data of "1" or data of "0" is stored in all the memory cells 800 in the cache memory.

Reading operation in the memory cell 800 is described. By setting the word line 809 to 'H', the n-channel transistor 801 (selection transistor) and the n-channel transistor 802 (selection transistor) are turned on, so that electrical continuity is obtained. The data line 810 and the data line 811 detect 'H' or 'L', and memory content (data) is stored. The data line 810 reads out a potential corresponding to the node 812, and the data line 811 reads out a potential corresponding to the node 813. A difference in the read potentials can be amplified by an amplification circuit such as a sense amplifier so as to detect data.

Figure 12B:
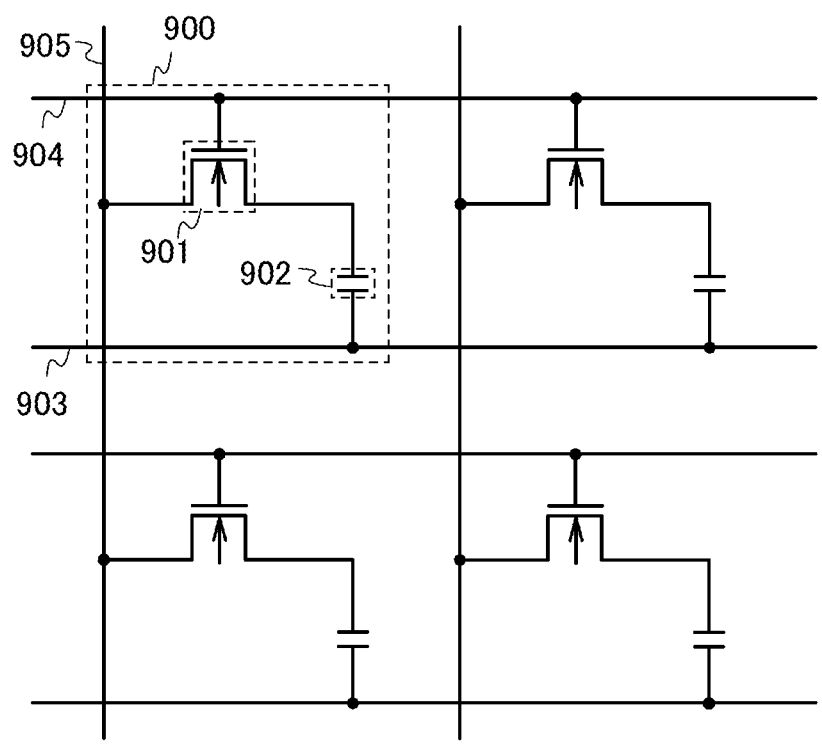

FIG. 12B shows a memory cell 900 included in the main memory device in Embodiment 1. The memory cell 900 includes an n-channel transistor 901 and a capacitor 902. One memory cell 900 includes one transistor and one capacitor. In addition, a ground line 903, a word line 904, and a data line 905 are provided.

A gate terminal of the n-channel transistor 901 is electrically connected to the word line 904. One of a source terminal and a drain terminal of the n-channel transistor 901 is electrically connected to the data line 905. The other of the source terminal and the drain terminal of the n-channel transistor 901 is electrically connected to one terminal of the capacitor 902. The other terminal of the capacitor 902 is electrically connected to the ground line 903.

Writing operation in the memory cell 900 is described. By setting the potential of the word line 904 to 'H', the potential of the gate of the n-channel transistor 901 becomes 'H', so that "1" is written to the memory cell 900. In addition, by setting the potential of the data line 905 to 'H', the n-channel transistor 901 is turned on, and electrical continuity is obtained. The capacitor 902 is charged via the n-channel transistor 901. Since data of "1" is stored in the capacitor 902, "1" is written to the memory cell 900.

On the other hand, in order to write "0" to the memory cell 900, data of "1" should be excluded. Thus, the potential of the word line 904 is set to 'H', and the potential of the data line 905 is set to 'L', whereby the n-channel transistor 901 is turned off. At this time, the n-channel transistor 901 does not have conduction. The capacitor 902 is discharged via the n-channel transistor 901. Since data of "0" is stored in the capacitor 902, "0" is written to the memory cell 900. Note that when "0" has been already written to the memory cell 900, no change occurs. In the above manner, the potential of the word line 904 and the potential of the data line 905 are alternately changed between 'H' and 'L', whereby data of "1" or "0" can be written to all the memory cells 900 in the main memory device.

A mode of holding stored data in the memory cell 900 is described. By holding the potential of the word line 904 at 'L', the n-channel transistor 901 is in an off state, so that the memory cell 900 can hold data of "1" or "0". At this time, the capacitor 902 is disconnected from the data line 905 and accordingly is not charged or discharged. Thus, all the memory cells 900 store data of "1" or data of "0".

Reading operation in the memory cell 800 is described. In order to read out the written data from the memory cell 800, the potential of the word line 904 is set to 'H', and whether or not charge flows into the data line 905 from the capacitor 902 is detected. A potential difference can be amplified by an amplification circuit such as a sense amplifier so as to detect data.

For example, in the case where "1" is stored in the memory cell 800, the discharge current flows into the data line 905 from the capacitor 902 via the n-channel transistor 901. Thus, the potential of the data line 905 instantaneously increases, which indicates that "1" is stored in the memory cell 800.

On the other hand, in the case where "0" is stored in the memory cell 800, charge does not flow into the data line 905 from the capacitor 902 via the n-channel transistor 901. Thus, an increase in the potential of the data line 905 is not detected, which indicates that "0" is stored in the memory cell 800. In the above manner, the potential of the word line 904 and the potential of the data line 905 are alternately changed between 'H' and 'L', whereby data of "1" and "0" in all the memory cells 900 in the main memory device can be read out. Note that the capacitor 902 is discharged in reading; thus, the stored data is corrupted. Therefore, in the case where a DRAM is used as the main memory device, rewriting operation is needed.

The structures, methods, and the like described in this embodiment can be combined as appropriate with any of the structures, methods, and the like described in the other embodiments.

Embodiment 4

A semiconductor device disclosed in this specification can be applied to a variety of electronic devices including a CPU. By stopping supply of a power supply voltage to the CPU, the amount of power consumption is suppressed, and accordingly, power consumption of the electronic device can be reduced. Examples of electronic devices include a portable television device (also referred to as a television or a television receiver), a camera such as a digital camera or a digital video camera, a digital photo frame, a mobile phone, a portable game machine, a portable information terminal, an audio reproducing device, a game machine (such as a pachinko machine or a slot machine), and a game console, and the like.

Figure 13A:
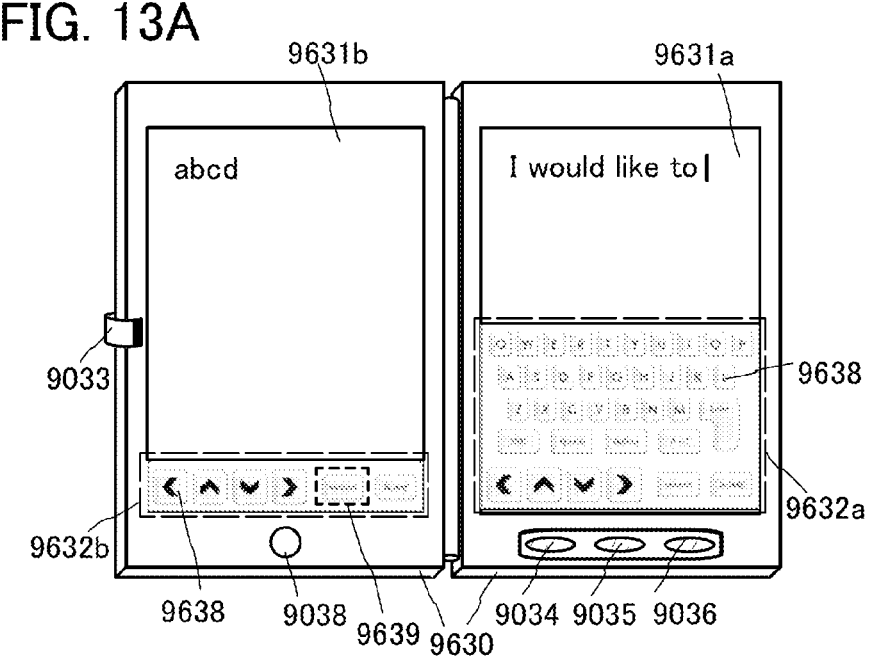
FIGS. 13A to 13C illustrate an example of an electronic device.
Figure 13B:
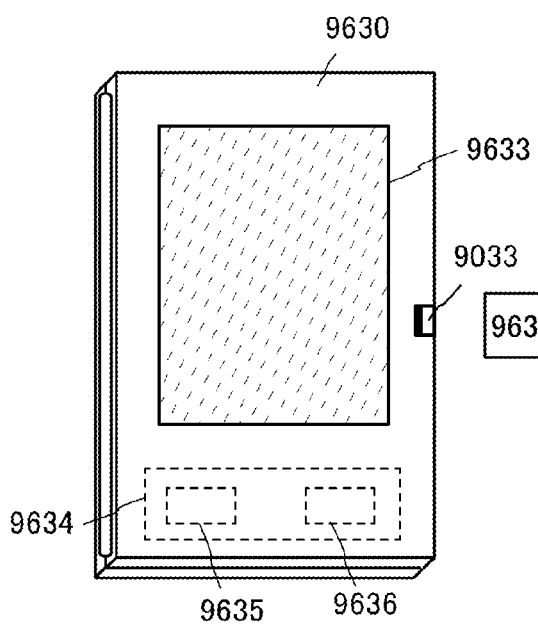
Figure 13C:
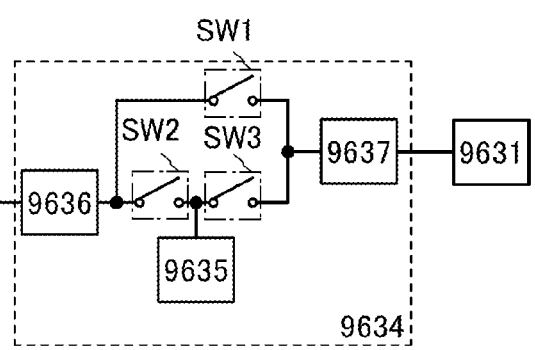

FIGS. 13A to 13C illustrate a specific example of an electronic device. FIGS. 13A and 13B illustrate a tablet terminal that can be folded. The tablet terminal includes a CPU and the like to which the power supply voltage is supplied from a battery. In FIG. 13A, the tablet terminal is opened, and includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a, and data can be input by touching operation keys 9638 that are displayed. Although a structure in which a half region in the display portion 9631a has only a display function and the other half region also has a touch panel function is shown as an example, the display portion 9631a is not limited to the structure. For example, the display portion 9631a can display a keyboard in the whole region to be used as a touch panel, and the display portion 9631b can be used as a display screen.

Like the display portion 9631a, part of the display portion 9631b can be a touch panel region 9632b. When a finger, a stylus, or the like touches the place where a button 9639 for switching to keyboard display is displayed in the touch panel, keyboard buttons can be displayed on the display portion 9631b.

Touch input can be performed concurrently on the touch panel regions 9632a and 9632b.

The switch 9034 for switching display modes can switch display orientation (e.g., between landscape mode and portrait mode) and select a display mode (switch between monochrome display and color display), for example. With the switch 9036 for switching to power-saving mode, the luminance of display can be optimized in accordance with the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor. Note that in the power-saving mode, supply of the power supply voltage to the CPU included in the tablet terminal may be completely stopped.

Note that FIG. 13A shows an example in which the display portion 9631a and the display portion 9631b have the same display size; however, without limitation thereon, one of the display portions may be different from the other display portion in size and display quality. For example, one of them may be a display panel that can display higher-definition images than the other.

The tablet terminal is closed in FIG. 13B. The tablet terminal includes the housing 9630, a solar cell 9633, a charge/discharge control circuit 9634, a battery 9635, and a DCDC converter 9636. Note that in FIG. 13B, a structure including a battery 9635 and a DCDC converter 9636 is illustrated as an example of the charge/discharge control circuit 9634.

Since the tablet terminal can be folded in two, the housing 9630 can be closed when the tablet terminal is not in use. Thus, the display portions 9631a and 963b can be protected, thereby providing a tablet terminal with high endurance and high reliability for long-term use.

In addition, the tablet terminal illustrated in FIGS. 13A and 13B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the battery 9635 can be charged efficiently. When a lithium ion battery is used as the battery 9635, there is an advantage of downsizing or the like.

The structure and the operation of the charge/discharge control circuit 9634 illustrated in FIG. 13B will be described with reference to a block diagram in FIG. 13C. The solar cell 9633, the battery 9635, the DCDC converter 9636, a converter 9637, switches SW1 to SW3, and the display portion 9631 are shown in FIG. 13C, and the battery 9635, the DCDC converter 9636, the converter 9637, and the switches SW1 to SW3 correspond to the charge/discharge control circuit 9634 in FIG. 13B.

First, an example of operation in the case where power is generated by the solar cell 9633 using external light is described. The voltage of power generated by the solar battery is raised or lowered by the DCDC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and a switch SW2 is turned on so that charge of the battery 9635 may be performed.

Here, the solar cell 9633 is shown as an example of a power generation unit; however, there is no particular limitation on a way of charging the battery 9635, and the battery 9635 may be charged with another power generation unit such as a piezoelectric element or a thermoelectric conversion element (Peltier element). For example, the battery 9635 may be charged with a non-contact power transmission module that transmits and receives power wirelessly (without contact) to charge the battery or with a combination of other charging units.

The structures, methods, and the like described in this embodiment can be combined as appropriate with any of the other structures, methods, and the like described in this embodiment or any of the structures, methods, and the like described in the other embodiments.

Embodiment 5

In this embodiment, an example of the structure of the nonvolatile register described in Embodiment 1 will be described with reference to FIG. 8A.

Figure 8A:
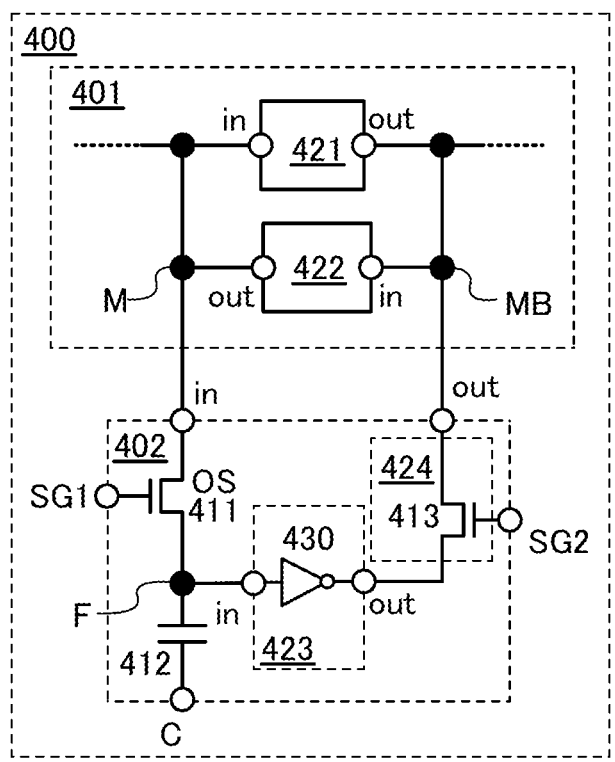
FIGS. 8A and 8B are circuit diagrams each illustrating a nonvolatile register according to one embodiment of the present invention.

In FIG. 8A, a nonvolatile register 400 includes a transistor 411 having extremely low off-state current, a capacitor 412, an arithmetic circuit 421, an arithmetic circuit 422, an arithmetic circuit 423, and a switch 424. A transistor comprising an oxide semiconductor layer comprising a channel formation region, beside which "OS" is written, is exemplified as the transistor 411. An output terminal of the arithmetic circuit 421 (represented by "out" in the figure) is electrically connected to an input terminal of the arithmetic circuit 422 (represented by "in" in the figure). The input terminal of the arithmetic circuit 422 is electrically connected to an output terminal of the arithmetic circuit 423 (represented by "out" in the figure) via the switch 424. An output terminal of the arithmetic circuit 422 (represented by "out" in the figure) is electrically connected to an input terminal of the arithmetic circuit 421 (represented by "in" in the figure). The input terminal of the arithmetic circuit 421 (represented by "in" in the figure) is electrically connected to one of a source and a drain of the transistor 411. The other of the source and the drain of the transistor 411 is electrically connected to one of the pair of electrodes of the capacitor 412 and to the input terminal of the arithmetic circuit 423 (represented by "in" in the figure). Here, one of the pair of electrodes of the capacitor 412 is referred to as "node F" (represented by "F" in the figure).

As each of the arithmetic circuit 421, the arithmetic circuit 422, and the arithmetic circuit 423, an inverter, a three-state buffer, a clocked inverter, a NAND circuit, a NOR circuit, and the like can be used. FIG. 8A shows an example in which an inverter 430 is used as the arithmetic circuit 423. For example, an analog switch, a transistor, or the like can be used as the switch. In FIG. 8A, a transistor 413 is used as the switch 424 as an example. The transistor 413 may be a transistor, for example, comprising a silicon layer or a silicon substrate comprising a channel formation region.

Here, the sum of the current drive capabilities of the arithmetic circuit 423 and the switch 424 is preferably higher than the current drive capability of the arithmetic circuit 421. In the case where the current drive capability of the switch 424 is sufficiently high, the current drive capability of the arithmetic circuit 423 is preferably set higher than that of the arithmetic circuit 421. Thus, the potential of a node MB (represented by "MB" in the figure) can easily be a signal (potential) corresponding to a signal held in the capacitor 412.

In the case, for example, where the arithmetic circuit 421 is composed of an inverter and this inverter and the inverter 430 use complementary transistors, each transistor is preferably designed with the following conditions. It is preferable to satisfy the inequality $\mu1(W1/L1)>\mu2(W2/L2)$, where L1, W1, and $\mu1$ represent respectively the channel length, channel width, and mobility of a transistor which is of one conductivity type in the inverter 430, while L2, W2, and $\mu2$ represent respectively the channel length, channel width, and mobility of a transistor which is of another conductivity type in the inverter for the arithmetic circuit 421. In other words, it is preferable to satisfy the inequality $\mu1(W1/L1)>\mu2(W2/L2)$, where L1, W1, and $\mu1$ represent respectively the channel length, channel width, and mobility of an n-channel transistor in the inverter 430, while L2, W2, and $\mu2$ represent respectively the channel length, channel width, and mobility of a p-channel transistor in the inverter in the arithmetic circuit 421. Alternatively, it is preferable to satisfy the inequality $\mu1(W1/L1)>\mu2(W2/L2)$, where L1, W, and $\mu1$ represent respectively the channel length, channel width, and mobility of a p-channel transistor in the inverter 430, while L2, W2, and $\mu2$ represent respectively the channel length, channel width, and mobility of an n-channel transistor in the inverter in the arithmetic circuit 421. Here, "the current drive capability of the switch 424 is sufficiently high" means, for example, that when the switch 424 is formed with the transistor 413, $\mu3(W3/L3)$, where L3, W3, and $\mu3$ represent respectively the channel length, channel width, and mobility of the transistor, is sufficiently large compared with $\mu2(W2/L2)$ or $\mu1(W1/L1)$. It is preferable to design the transistors in each circuit so that these inequalities can be satisfied when $\mu3(W3/L3)$ is sufficiently high.

A gate of the transistor 411 is electrically connected to a terminal SG1. The on or off state of the transistor 411 is selected with a control signal input to the terminal SG1. The on or off state of the switch 424 is selected with a control signal input to a terminal SG2. In FIG. 8A, the terminal SG2 is electrically connected to a gate of the transistor 413. The other of the pair of electrodes of the capacitor 412 is electrically connected to a terminal C. To the terminal C, a constant voltage can be input. For example, a low power supply potential can be input.

In the case where the arithmetic circuit 421, the arithmetic circuit 422, and the arithmetic circuit 423 are formed using transistors, the transistors may be transistors comprising a layer or substrate formed using a semiconductor other than an oxide semiconductor comprising a channel formation region. For example, the transistor can be a transistor which comprises a silicon layer or a silicon substrate comprising a channel formation region.

The transistor 411 may be a transistor having two gates above and below an oxide semiconductor layer. A control signal can be input to one gate, and a different control signal can be input to the other gate. The different control signal may be a signal with a fixed potential. The fixed potential may be either a low power supply potential or a high power supply potential. Note that the two gates may be electrically connected to each other and the control signal may be input to the gates. The threshold voltage or the like of the transistor 411 can be controlled by a signal input to the other gate. Further, the off-state current of the transistor 411 can be further reduced. The on-state current of the transistor 411 can also be increased.

In the nonvolatile register 400 in FIG. 8A, while the power supply voltage is supplied, the arithmetic circuit 421 and the arithmetic circuit 422 form a feedback loop and data can be held with the feedback loop. Examples of circuits that include the arithmetic circuit 421 and the arithmetic circuit 422 and hold data with a feedback loop include flip-flop circuits. The structure shown in FIG. 8A includes a flip-flop circuit 401 and the following additional components: the transistor 411 whose off-state current is extremely low, the capacitor 412, the arithmetic circuit 423, and the switch 424. In FIG. 8A, these additional components are in a circuit 402.

The flip-flop circuit 401 includes a node M (represented by "M" in the figure) and the node MB. While a power supply voltage is supplied, a signal at the node MB is the inverted signal of a signal at the node M. One of a source and a drain of the transistor 411 is electrically connected to the node M. The other of the source and the drain of the transistor 411 is electrically connected to one of the pair of electrodes of the capacitor 412 and to the input terminal of the arithmetic circuit 423 (represented by "in" in the figure). The output terminal of the arithmetic circuit 423 (represented by "out" in the figure) is electrically connected to the node MB via the switch 424.

Figure 8B:
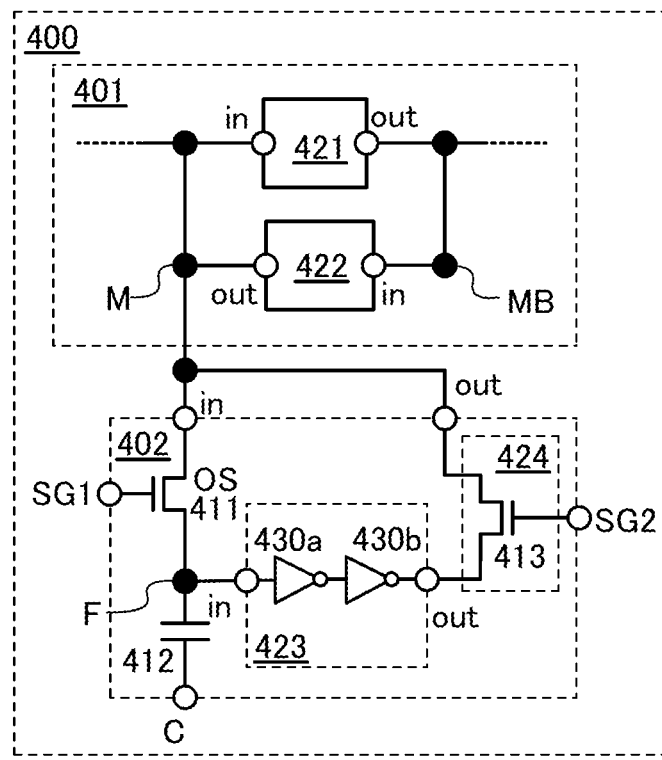

Although FIG. 8A shows a structure where the arithmetic circuit 423 is a circuit that outputs the inverted signal of an input signal and the output is input to the node MB via the switch 424, the present invention is not limited to this. A structure where the arithmetic circuit 423 is a circuit that outputs a signal without inverting an input signal and the output is input to the node M via the switch 424 as shown in FIG. 8B may be used instead. Such an arithmetic circuit 423 may have a structure, for example, where an even number of inverters are electrically connected in series. FIG. 8B shows the case where the arithmetic circuit 423 has a structure where an inverter 430*a* and an inverter 430*b* are electrically connected in series. Since the other components in FIG. 8B are the same as those in FIG. 8A, their description is omitted.

<<Driving Method of Nonvolatile Register>>

One embodiment of a method for driving the nonvolatile register 400 in FIG. 8A is described. The following is the driving method of the nonvolatile register 400 in the case where supply of a power supply voltage is stopped in order to reduce power consumption after the supply of the power supply voltage and then supply of the power supply voltage is resumed. Note that a description will be given on the assumption that the flip-flop circuit 401 inputs and outputs data in synchronism with a clock signal and an inverted clock signal. The description will be given with reference to a timing diagram of FIG. 9 and the reference numerals in FIG. 8A.

Figure 9:
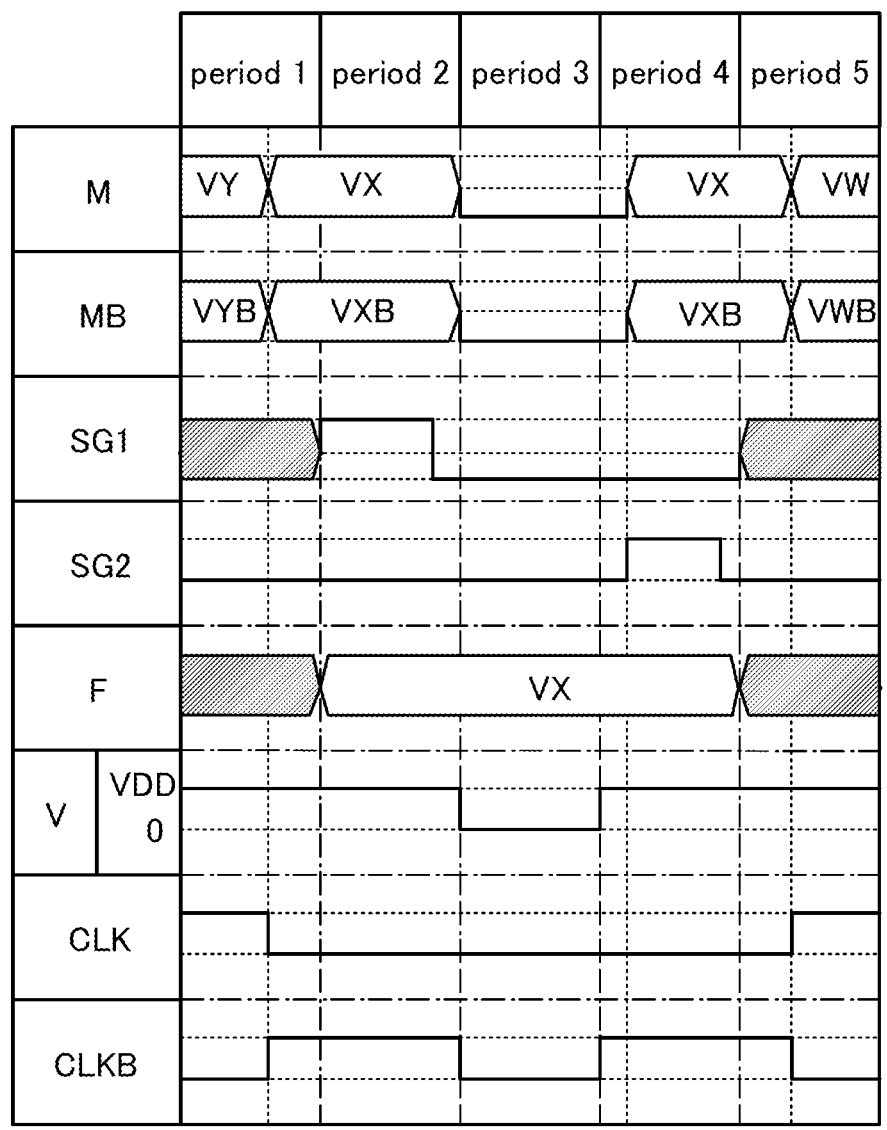
FIG. 9 is a timing chart showing operation of a nonvolatile register according to one embodiment of the present invention.

In FIG. 9, M represents the potential of the node M; MB, the potential of the node MB; F, the potential of the node F; SG1, the potential of the control signal input to the terminal SG1; SG2, the potential of the control signal input to the terminal SG2; V, the power supply voltage; CLK, the potential of the clock signal; and CLKB, the potential of the inverted signal of the clock signal. In FIG. 9, a shaded portion may be any signal potential.

Although FIG. 9 shows the case where the transistor 411 is turned on when SG1 is at a high level, and turned off state when SG1 is at a low level, the present invention is not limited to this. The potential of SG1 can be determined as appropriate so that the on and off states of the transistor 411 follow the description below. Although FIG. 9 shows the case where the transistor 413 is turned on when SG2 is at a high level, and turned off when SG2 is at a low level, the present invention is not limited to this. The potential of SG2 can be determined as appropriate so that the on and off states of the transistor 413 follow the description below.

<Operation During Supplying Power Supply Voltage>

In a period 1, VDD as a power supply voltage V is supplied to the nonvolatile register 400, and the potential CLK of the clock signal and the potential CLKB of the inverted signal of the clock signal periodically change between high and low levels. At this time, in synchronization with the clock signal and the inverted signal of the clock signal, the feedback loop composed of the arithmetic circuit 421 and the arithmetic circuit 422 holds a signal corresponding to data (and its inverted signal). FIG. 9 shows the case where, at the end of the period 1, the node M holds a signal potential VX, while the node MB holds a signal potential VXB. Here, the signal potential VXB corresponds to the potential of the inverted signal of a signal corresponding to the signal potential VX. In the period 1, SG2 is at a low level, so that the switch 424 is in the off state. Thus, the nonvolatile register 400 holds input data in the feedback loop, and outputs the data held in the feedback loop. Here, the transistor 411 comprising an oxide semiconductor layer comprising a channel formation region has a lower mobility than a transistor comprising a silicon layer or a silicon substrate comprising a channel formation region. The presence of a transistor having a low mobility in a feedback loop decreases the data inputting and outputting speed of the feedback loop. In the nonvolatile register 400, the transistor 411 comprising an oxide semiconductor layer comprising a channel formation region is not present in the feedback loop. Thus, the feedback loop achieves high-speed data writing and reading, which increase the data writing and reading speed (operation speed) of the nonvolatile register 400. Note that, here, the transistor 411 comprising an oxide semiconductor layer comprising a channel formation region is preferably in the off state. If the transistor 411 is always in the on state, a signal potential corresponding to the data is input to the capacitor 412 when data is written or read to/from the feedback loop, which decreases the data writing and reading speed of the feedback loop.

<Operation Before Stop of Supplying Power Supply Voltage>

In a period 2, the potential CLK of the clock signal and the potential of the inverted signal of the clock signal are fixed. In other words, the potential CLK of the clock signal and the potential CLKB of the inverted signal of the clock signal remain unchanged since given data is held in the feedback loop. This means that a period during which the levels (potentials) of the clock signal and the inverted signal of the clock signal, which normally change between high and low levels periodically, do not change is provided. Here, a period during which the levels (the signal potentials) of the clock signal and the inversion signal of the clock signal are fixed is also referred to as a clock signal fixed period. The period 2 corresponds to a clock signal fixed period. For this reason, in the clock signal fixed period, the node M remains at the signal potential VX, while the node MB remains at the signal potential VXB. Although FIG. 9 shows the case where the potential CLK of the clock signal is fixed at a low level, while the potential CLKB of the inverted signal of the clock signal is fixed at a high level, the present invention is not limited to this. The potential CLK of the clock signal and the potential CLKB of the inverted signal of the clock signal may be fixed at a high level and a low level, respectively. Further, in the clock signal fixed period, SG1 is changed from a high level to a low level so that the transistor 411 whose off-state current is extremely low is turned off. For example, if SG1 is at a high level and the transistor 411 is in the on state immediately before the clock signal fixed period, SG1 is changed from a high level to a low level to make the transistor 411 be in the off state in the clock signal fixed period. In contrast, for example, if SG1 is at a low level and the transistor 411 is in the off state immediately before the clock signal fixed period, SG1 is changed from a low level to a high level so that the transistor 411 is temporarily turned on, and SG1 is then set at a low level to make the transistor 411 to be turned off in the clock signal fixed period. Thus, the potential of the node F corresponding to one of the pair of electrodes of the capacitor 412 becomes VX. Note that it takes time for the potential of the node F to be VX after the transistor 411 has a high level potential. In this manner, a signal (a potential) corresponding to the data retained by the feedback loop is held in the capacitor 412. Note that SG2 is at a low level, so that the switch 424 remains in the off state.

As described above, by switching the transistor 411 whose off-state current is extremely low to the off state while the levels of the clock signal and the inverted signal of the clock signal are fixed, a signal (potential) corresponding to data in the feedback loop can be transferred to and held in the capacitor 412 while fluctuations of a signal (potential) corresponding to the data are suppressed.

<Operation of Stopping Supply of Power Supply Voltage>

In a period 3, the supply of the supply voltage to the nonvolatile register 400 is stopped (the power supply voltage V is set to be zero). Consequently, in the period 3, the potentials of the node M and the node MB are any potential. Further, in the period 3, the supply of the clock signal and the inverted signal of the clock signal can be stopped. Here, "stopping the supply of the clock signal and the inverted signal of the clock signal" means "setting the potential CLK of the clock signal and the potential CLKB of the inverted signal of the clock signal to be at the same level (e.g., a low level). By stopping the supply of the clock signal and the inverted signal of the clock signal as well as the supply of the power supply voltage, power for supplying the clock signal and the inverted signal of the clock signal can also be reduced. Note that SG2 is at a low level, so that the switch 424 remains in the off state.

Here, SG1 is at a low level, so that the transistor 411 whose off-state current is extremely low remains in the off state. Consequently, a signal (potential) corresponding to data that has been held in the feedback loop is held in the capacitor 412 even after the supply of the power supply voltage V to the nonvolatile register 400 is stopped. In other words, the potential of the node F remains VX. In this way, the use of the transistor 411 whose off-state current is extremely low allows a signal (potential) in the capacitor 412 to be held for a long period of time, so that the nonvolatile register 400 can hold data for a long period of time after the supply of the power supply voltage is stopped. The fatigue of the nonvolatile register 400 due to the repetition of data writing is insignificant, which increases the number of possible data writing operations.

Note that, in the nonvolatile register 400, while the transistor 411 whose off-state current is extremely low and the switch 424 are in the off state, one of the pair of electrodes of the capacitor 412 is electrically disconnected from each node in the feedback loop. Therefore, while the transistor 411 whose off-state current is extremely low and the switch 424 are in the off state, the supply of the power supply voltage to the nonvolatile register 400 and the supply of the clock signal and the inverted signal of the clock signal can be stopped at the same time, or one of these supplies can be stopped after the other is stopped. In other words, the supply of the power supply voltage can be stopped in a flexible sequence.

<Operation of Resuming Supply of Power Supply Voltage>

In a period 4, the supply of the power supply voltage to the nonvolatile register 400 is resumed using VDD as the power supply voltage V. In addition, the clock signal and the inverted signal of the clock signal returned and fixed to the levels (potentials) at which they had been while the supply of the supply voltage had been stopped are supplied. In this manner, a clock signal fixed period is started. Referring to FIG. 9, the potential CLK of the clock signal is fixed at a low level, while the potential CLKB of the inverted signal of the clock signal is fixed at a high level. Here, if the transistor 411 and the switch 424 are in the off state, the supply of the power supply voltage to the nonvolatile register 400 and the supply of the clock signal and the inverted signal of the clock signal returned and fixed to the levels (potentials) at which they had been while the supply of the supply voltage had been stopped can be restarted at the same time, or one of these supplies can be restarted after the other is restarted. In other words, the supply of the supply voltage can be restarted in a flexible sequence.

Then, SG2 is set to be at a high level, so that the switch 424 is turned on. Note that SG1 is at a low level and the transistor 411 whose off-state current is extremely low remains in the off state. The signal (potential) held in the capacitor 412, i.e., the potential VX of the node F is converted into a corresponding signal VXB by the arithmetic circuit 423, and then, once the switch 424 is turned on, input to the node MB in the feedback loop. Thus, the potential of the node MB eventually becomes VXB. Then, the potential of the node M eventually becomes VX. In this way, the data that has been held before the supply of the power supply voltage is stopped is held in the feedback loop again. Then, SG2 is set to be at a low level, so that the switch 424 is turned off again.

Here, the sum of the current drive capabilities of the arithmetic circuit 423 and the switch 424 is preferably higher than the current drive capability of the arithmetic circuit 421. In the case where the current drive capability of the switch 424 is sufficiently high, the current drive capability of the arithmetic circuit 423 is preferably set higher than that of the arithmetic circuit 421. Thus, the potential of a node MB can easily be a signal (potential) corresponding to a signal held in the capacitor 412.

In the case, for example, where the arithmetic circuit 421 is composed of an inverter and this inverter and the inverter 430 use complementary transistors, each transistor is preferably designed with the following conditions. It is preferable to satisfy the inequality $\mu 1(W1/L1) > \mu 2(W2/L2)$, where L1, W1, and $\mu 1$ represent respectively the channel length, channel width, and mobility of a transistor which is of one conductivity type in the inverter 430, while L2, W2, and $\mu 2$ represent respectively the channel length, channel width, and mobility of a transistor which is of another conductivity type in the inverter for the arithmetic circuit 421. In other words, it is preferable to satisfy the inequality $\mu 1(W1/L1) > \mu 2(W2/L2)$, where L1, W1, and $\mu 1$ represent respectively the channel length, channel width, and mobility of an n-channel transistor in the inverter 430, while L2, W2, and $\mu 2$ represent respectively the channel length, channel width, and mobility of a p-channel transistor in the inverter in the arithmetic circuit 421. Alternatively, it is preferable to satisfy the inequality $\mu 1(W1/L1) > \mu 2(W2/L2)$, where L1, W1, and $\mu 1$ represent respectively the channel length, channel width, and mobility of a p-channel transistor in the inverter 430, while L2, W2, and $\mu 2$ represent respectively the channel length, channel width, and mobility of an n-channel transistor in the inverter in the arithmetic circuit

421. Here, "the current drive capability of the switch 424 is sufficiently high" means, for example, that when the switch 424 is composed of the transistor 413, μ3(W3/L3), where L3, W3, and μ3 represent respectively the channel length, channel width, and mobility of the transistor, is sufficiently large compared with μ2(W2/L2) or μ1(W1/L1). It is preferable to design the transistors in each circuit so that these inequalities can be satisfied when μ(W3/L3) is sufficiently high.

In a period 5, fixing of the level (potential) of the clock signal and the inverted signal of the clock signal is stopped. In other words, the clock signal and the inverted signal of the clock signal are returned to the normal state where their levels (potentials) periodically change between high and low levels. In this way, in the nonvolatile register, the feedback loop can restart data writing and reading. The subsequent operation is similar to "Operation during Supplying Power Supply Voltage".

As described above, a path for transferring and writing data held in the feedback loop to the capacitor 412 (data saving path) and a path for returning the data held in the capacitor 412 to the feedback loop (data returning path) are separate. The use of an element with high mobility as the switch 424 placed on the data returning path enables "Operation of Resuming Supply of Power Supply Voltage" to be conducted at higher speed. For example, the use of a transistor comprising a silicon layer or a silicon substrate comprising a channel formation region as the transistor 413 enables "Operation of Resuming Supply of Power Supply Voltage" to be conducted at higher speed.

The circuit 402 in FIG. 8A can be called "nonvolatile register" because of the operation as described above: the circuit 402 receives data from an input terminal (represented by "in" in the figure), which is held in the flip-flop circuit 401 during supplying the power supply voltage, and holds this data even while the power supply voltage is not supplied; and then, once the power supply voltage is supplied, the circuit 402 transmits (a signal corresponding to) this data to the flip-flop circuit 401 from an output terminal (represented by "out" in the figure). The fatigue of the nonvolatile register due to the repetition of data writing is insignificant, which increases the number of possible data writing operations.

Up to here, the driving method of the nonvolatile register 400 is described.

<Memory Device and Signal Processing Circuit>

One embodiment of a memory device according to the present invention is a memory device including one or more nonvolatile registers 400 described above. One embodiment of a signal processing circuit according to the present invention is a signal processing circuit including the memory device. For example, the nonvolatile register 400 can be used for a memory device such as a register or a cache memory included in the signal processing circuit.

Further, the signal processing circuit may include some kinds of logic circuits such as an arithmetic circuit which transmits/receives data to/from the memory device in addition to the above memory device. Not only the supply of power supply voltage to the memory device but also the supply of power supply voltage to the arithmetic circuit which transmits/receives data to/from the memory device may be stopped.

One embodiment of the signal processing circuit according to the present invention may include a CPU, a memory, and a peripheral control device for controlling access between the memory and the CPU. The CPU, the memory, and the peripheral control device may include the nonvolatile register 400. Further, supply of power supply voltage may be stopped in the entire signal processing circuit including the CPU, the memory, and the peripheral control device.

The use of the nonvolatile register 400 for the signal processing circuit prevents data from being lost by stopping the supply of the power supply voltage and allows the signal processing circuit to return, in a short time after the supply of the power supply voltage is resumed, to the same state as before the supply of the power supply voltage is stopped. This enables the use of a normally-off driving method in which the power supply voltage is supplied only when necessary, thereby dramatically reducing power consumption. Moreover, the operation speed of the signal processing circuit can be increased, which increases reliability.

This embodiment can be freely combined with any of the other embodiments in this specification.

Embodiment 6

In this embodiment, an example of a structure which is different from that in FIG. 8A illustrating the nonvolatile register described in Embodiment 1 will be described with reference to FIG. 10.

Figure 10:
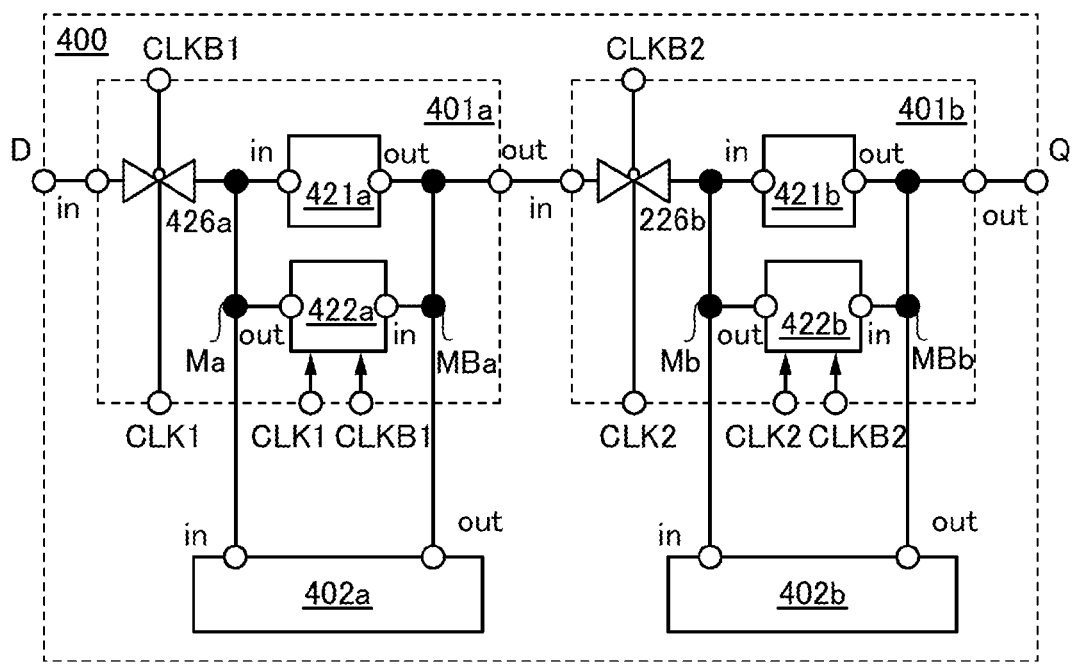
FIG. 10 is a circuit diagram illustrating a nonvolatile register according to one embodiment of the present invention.

In FIG. 10, a nonvolatile register 400 includes a flip-flop circuit 401a, a flip-flop circuit 401b, a circuit 402a, and a circuit 402b. An output terminal of the flip-flop circuit 401a (represented by "out" in the figure) is electrically connected to an input terminal of the flip-flop circuit 401b (represented by "in" in the figure). An input terminal of the flip-flop circuit 401a (represented by "in" in the figure) serves as an input terminal D of the nonvolatile register 400, while an output terminal of the flip-flop circuit 401b (represented by "out" in the figure) serves as an output terminal Q of the nonvolatile register 400.

The circuit 402a and the circuit 402b may have the same configuration as that of the circuit 402 shown in FIG. 8A.

The flip-flop circuit 401a includes an arithmetic circuit 421a and an arithmetic circuit 422a. Electrical connections among the arithmetic circuit 421a, the arithmetic circuit 422a, and the circuit 402a may be the same as those among the arithmetic circuit 421, the arithmetic circuit 422, and the circuit 402 shown in FIG. 8A. Note that the flip-flop circuit 401a includes an analog switch 426a. The input terminal (represented by "in" in the figure) of the flip-flop circuit 401a is electrically connected to a node Ma via the analog switch 426a. The analog switch 426a and the arithmetic circuit 422a receive a clock signal CLK1 and an inverted signal CLK1B of the clock signal CLK1. Here, with the clock signal CLK1 and the inverted signal CLK1B of the clock signal CLK1, when the analog switch 426a is in the on state, the output of the arithmetic circuit 422a becomes floating, and when the analog switch 426a is in the off state, the arithmetic circuit 422a inverts an input signal and outputs the inverted signal. A node MBa is electrically connected to the output terminal (represented by "out" in the figure) of the flip-flop circuit 401a.

The flip-flop circuit 401b includes an arithmetic circuit 421b and an arithmetic circuit 422b. Electrical connections among the arithmetic circuit 421b, the arithmetic circuit 422b, and the circuit 402b may be the same as those among the arithmetic circuit 421, the arithmetic circuit 422, and the circuit 402 shown in FIG. 8A. Note that the flip-flop circuit 401b includes an analog switch 426b. The input terminal (represented by "in" in the figure) of the flip-flop circuit 401b is electrically connected to a node Mb via the analog switch 426b. The analog switch 426b and the arithmetic circuit 422*b* receive a clock signal CLK2 and an inverted signal CLK2B of the clock signal CLK2. Here, with the clock signal CLK2 and the inverted signal CLK2B of the clock signal CLK2, when the analog switch 426*b* is in the on state, the output of the arithmetic circuit 422*b* becomes floating, and when the analog switch 426*b* is in the off state, the arithmetic circuit 422*b* inverts an input signal and outputs the inverted signal. A node MBb is electrically connected to the output terminal (represented by "out" in the figure) of the flip-flop circuit 401*b*.

The clock signal CLK2 may be either the inverted signal of the clock signal CLK1 or a signal out of phase with the clock signal CLK1. In other words, the nonvolatile register 400 in FIG. 10 can receive either a single-phase clock signal or a two-phase clock signal. By supplying a two-phase clock, setting each of the duty cycles (the rate of a period in which a signal is at a high level in a cycle) of the clock signal CLK1 and the clock signal CLK2 to be less than 50%, and providing a period in which both the clock signal CLK1 and the clock signal CLK2 are at a low level, data input to the input terminal D can be prevented from being output from the output terminal Q regardless of the clock signals (the clock signals CLK1 and CLK2). Note that the phenomenon in which the data input to the input terminal D is output from the output terminal Q regardless of the clock signals (the clock signals CLK1 and CLK2) is referred to as "data leakage" or "data racing", for example.

<<Driving Method of Nonvolatile Register>>

Figure 11:
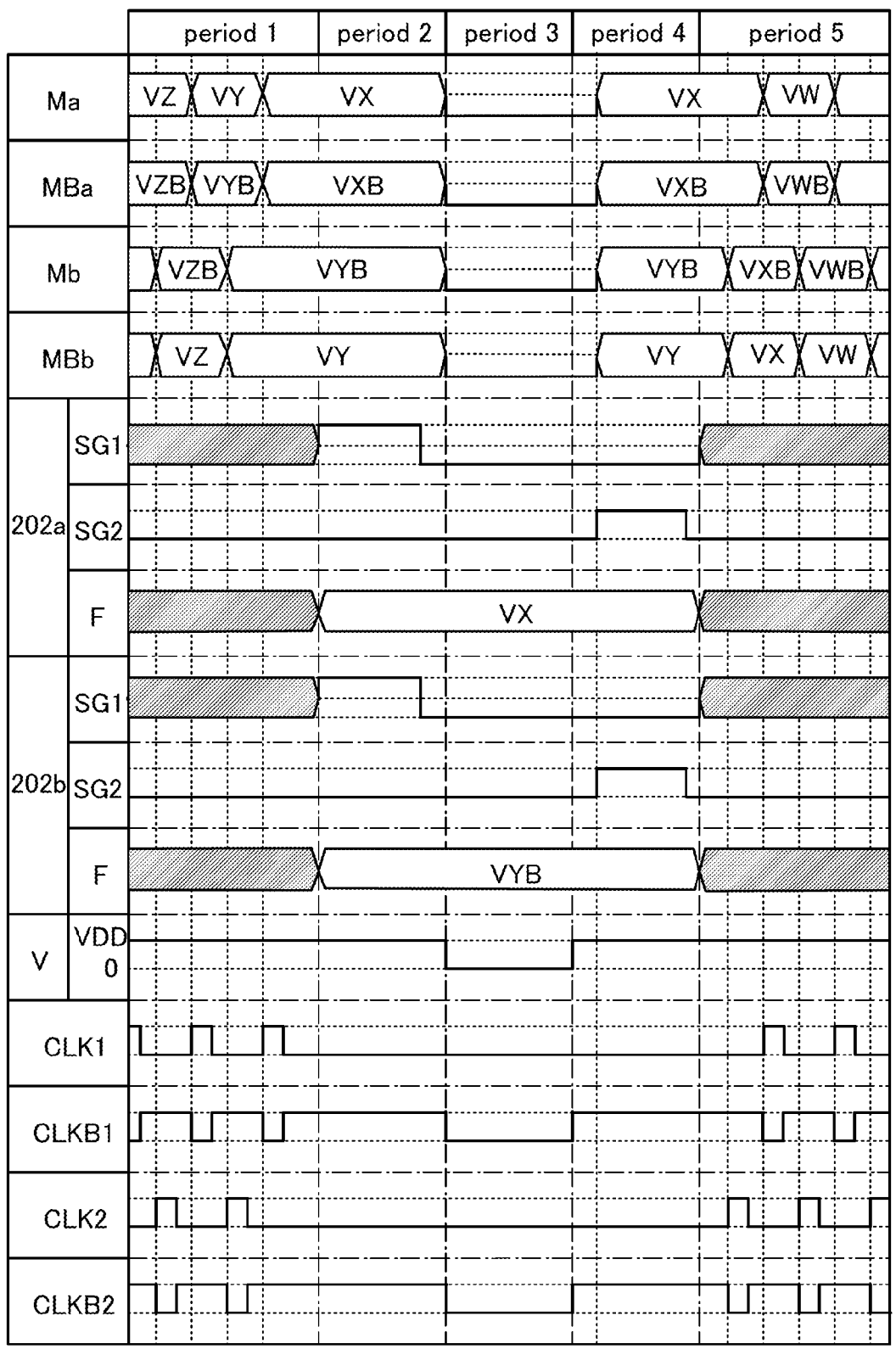
FIG. 11 is a timing chart showing operation of a nonvolatile register according to one embodiment of the present invention.

A method for driving the nonvolatile register 400 in FIG. 10 is described with a timing chart in FIG. 11. The reference numerals in FIG. 8A and FIG. 10 are used.

In FIG. 11, Ma represents the potential of the node Ma; MBa, the potential of the node MBa; Mb, the potential of the node Mb; MBb, the potential of the node MBb; V, the power supply voltage; CLK1, the potential of the clock signal CLK1; CLKB1, the potential of the inverted signal of the clock signal CLK1; CLK2, the potential of the clock signal CLK2; CLKB2, the potential of the inverted signal of the clock signal CLK2. In the circuits 402*a* and 402*b*, F represents the potential of the node F; SG1, the potential of a control signal input to the terminal SG1; SG2, the potential of a control signal input to the terminal SG2. In FIG. 11, a shaded portion may be any signal potential.

Although FIG. 11 shows the case where the transistor 411 is turned on when SG1 is at a high level, and turned off when SG1 is at a low level, the present invention is not limited to this. The potential of SG1 can be determined as appropriate so that the on and off states of the transistor 411 follow the description below. Although FIG. 11 shows the case where the transistor 413 is turned on when SG2 is at a high level, and turned off when SG2 is at a low level, the present invention is not limited to this. The potential of SG2 can be determined as appropriate so that the on and off states of the transistor 413 follow the description below.

<Operation During Supplying Power Supply Voltage>

In a period 1, VDD as a power supply voltage V is supplied to the nonvolatile register 400 and CLK, CLK2, CLKB1, and CLKB2 periodically change between high and low levels. Here, in the period 1 shown in FIG. 11, by setting the duty cycles (the rate of a period in which a signal is at a high level in a cycle) of the clock signal CLK1 and the clock signal CLK2 to be less than 50% each and providing a period in which both the clock signal CLK1 and the clock signal CLK2 are at a low level, data input to the input terminal D is prevented from being output from the output terminal Q regardless of the clock signals (the clock signals CLK1 and CLK2).

In the period 1, in synchronization with the clock signal and the inverted signal of the clock signal, the feedback loop composed of the arithmetic circuit 421*a* and the arithmetic circuit 422*a* and the feedback loop composed of the arithmetic circuit 421*b* and the arithmetic circuit 422*b* each hold a signal corresponding to data (and its inverted signal). FIG. 11 shows the case where, at the end of the period 1, the node Ma holds a signal potential VX, the node MBa holds a signal potential VXB, the node Mb holds a signal potential VYB, and the node MBb holds a signal potential VY. Here, the signal potential VXB corresponds to the potential of the inverted signal of a signal corresponding to the signal potential VX. The signal potential VYB corresponds to the potential of the inverted signal of a signal corresponding to the signal potential VY. In the period 1, in the circuits 402*a* and 402*b*, SG2 is at a low level, so that the switch 424 is in the off state. Thus, the nonvolatile register 400 holds data, which has been input from the input terminal D in synchronization with the clock signals CLK1 and CLK2, in the feedback loop in the flip-flop circuit 401*a*, transmits the data held in the feedback loop in the flip-flop circuit 401*a* to the flip-flop circuit 401*b*, and outputs the data held in the feedback loop in the flip-flop circuit 401*b* from the output terminal Q. Here, the transistor 411 comprising an oxide semiconductor layer comprising a channel formation region has a lower mobility than a transistor comprising a silicon layer or a silicon substrate comprising a channel formation region. The presence of a transistor having a low mobility in a feedback loop decreases the data inputting and writing speed of the feedback loop. In the nonvolatile register 400, the transistor 411 comprising an oxide semiconductor layer comprising a channel formation region is not present in the feedback loop. Thus, the feedback loop achieves high-speed data writing and reading, which increases the data writing and reading speed (operation speed) of the nonvolatile register 400. Note that, here, in each of the circuits 402*a* and 402*b*, the transistor 411 comprising an oxide semiconductor layer comprising a channel formation region is preferably in the off state. If, in each of the circuits 402*a* and 402*b*, the transistor 411 is always in the on state, a signal potential corresponding to the data is input to the capacitor 412 in each of the circuits 402*a* and 402*b* when data is written or read to/from the feedback loop. Consequently, the data writing and reading speed of each feedback loop is decreased.

<Operation Before Stop of Supply of Power Supply Voltage>

In a period 2, CLK1, CLK2, CLKB1, and CLKB2 are fixed. In other words, CLK1, CLK2, CLKB1, and CLKB2 remain unchanged since given data is held in the feedback loops. This means that a period during which the levels (potentials) of the clock signal and the inverted signal of the clock signal, which normally change between high and low levels periodically, do not change is provided. Here, a period during which the levels (the signal potentials) of the clock signal and the inverted signal of the clock signal are fixed is also referred to as a clock signal fixed period. The period 2 corresponds to a clock signal fixed period. For this reason, in the clock signal fixed period, the node Ma remains at the signal potential VX, the node MBa remains at the signal potential VXB, the node Mb remains at the signal potential VYB, and the node MBb remains at the signal potential VY. Although FIG. 11 shows the case where CLK1 and CLK2 are fixed at a low level, while CLKB1 and CLKB2 are fixed at a high level, the present invention is not limited to this. CLK1 and CLK2 may be fixed at a high level, and CLKB1 and CLKB2 may be fixed at a low level. Further, in the clock signal fixed period, in each of the circuits 402a and 402b, SG1 is changed from a high level to a low level so that the transistor 411 whose off-state current is extremely low is turned off. For example, if, in each of the circuits 402a and 402b, SG1 is at a high level and the transistor 411 is in the on state immediately before the clock signal fixed period, SG1 is changed from a high level to a low level to make the transistor 411 be in the off state in the clock signal fixed period. In contrast, for example, if, in each of the circuits 402a and 402b, SG1 is at a low level and the transistor 411 is in the off state immediately before the clock signal fixed period, SG1 is changed from a low level to a high level so that the transistor 411 is temporarily switched to the on state, and SG1 is then set at a low level to make the transistor 411 to be in the off state in the clock signal fixed period. Thus, in the circuit 402a, the potential of the node F corresponding to one of the pair of electrodes of the capacitor 412 becomes VX, while in the circuit 402b, the potential of the node F corresponding to one of the pair of electrodes of the capacitor 412 becomes VYB. Note that, in each of the circuits 402a and 402b, it takes time for the potential of the node F to be such potential after the transistor 411 is at a high level potential. In this way, a signal (potential) corresponding to data in each feedback loop is transferred to and held in each capacitor 412 in the circuits 402a and 402b. Note that, in each of the circuits 402a and 402b, SG2 is at a low level, so that the switch 424 remains in the off state.

As described above, by switching the transistor 411 whose off-state current is extremely low to the off state while the levels of the clock signal and the inverted signal of the clock signal are fixed, a signal (potential) corresponding to data in each feedback loop can be transferred to and held in the capacitor 412 in each of the circuits 402a and 402b while fluctuations of a signal (potential) corresponding to the data are suppressed.

<Operation of Stopping Supply of Power Supply Voltage>

In a period 3, the supply of the power supply voltage to the nonvolatile register 400 is stopped (the supply voltage V is set to be zero). Consequently, in the period 3, the potentials of the nodes Ma, Mb, MBa, and MBb are any potential. Further, in the period 3, the supply of the clock signal and the inverted signal of the clock signal can be stopped. Here, "stopping the supply of the clock signal and the inverted signal of the clock signal" means "setting CLK1 and CLKB1 to be at the same level (e.g., a low level), and CLK2 and CLKB2 to be at the same level (e.g., a low level). By stopping the supply of the clock signal and the inverted signal of the clock signal as well as the supply of the power supply voltage, power for supplying the clock signal and the inverted signal of the clock signal can also be reduced. Note that, in each of the circuits 402a and 402b, SG2 is at a low level, so that the switch 424 remains in the off state.

Here, in each of the circuits 402a and 402b, SG1 is at a low level, so that the transistor 411 whose off-state current is extremely low remains in the off state. Consequently, a signal (potential) corresponding to data that has been held in each feedback loop is held in the capacitor 412 each of the circuits 402a and 402b even after the supply of the power supply voltage V to the nonvolatile register 400 is stopped. In other words, the potential of the node F in the circuit 402a remains VX, while the potential of the node F in the circuit 402b remains VYB. In this way, the use of the transistor 411 whose off-state current is extremely low allows a signal (potential) in the capacitor 412 in each of the circuits 402a and 402b to be held for a long period of time, so that the nonvolatile register 400 can hold data for a long period of time after the supply of the power supply voltage is stopped. The fatigue of the nonvolatile register 400 due to the repetition of data writing is insignificant, which increases the number of possible data writing operations.

Note that, in each of the circuits 402a and 402b in the nonvolatile register 400, while the transistor 411 whose off-state current is extremely low and the switch 424 are in the off state, one of the pair of electrodes of the capacitor 412 is electrically disconnected from each node in the feedback loop. Therefore, while the transistor 411 and the switch 424 are in the off state in each of the circuits 402a and 402b, the supply of the power supply voltage to the nonvolatile register 400 and the supply of the clock signal and the inverted signal of the clock signal can be stopped at the same time, or one of these supplies can be stopped after the other is stopped. In other words, the supply of the power supply voltage can be stopped in a flexible sequence.

<Operation of Resuming Supply of Power Supply Voltage>

In a period 4, the supply of the power supply voltage to the nonvolatile register 400 is resumed using VDD as the power supply voltage V. In addition, the clock signal and the inverted signal of the clock signal returned and fixed to the levels (potentials) at which they had been while the supply of the power supply voltage had been stopped are supplied. In this manner, a clock signal fixed period is started. Referring to FIG. 11, CLK1 and CLK2 are fixed at a low level, while CLKB1 and CLKB2 are fixed at a high level. Here, if, in each of the circuits 402a and 402b, the transistor 411 and the switch 424 are in the off state, the supply of the power supply voltage to the nonvolatile register 400 and the supply of the clock signal and the inverted signal of the clock signal returned and fixed to the levels (potentials) at which they had been while the supply of the power supply voltage had been stopped can be restarted at the same time, or one of these supplies can be restarted after the other is restarted. In other words, the supply of the supply voltage can be restarted in a flexible sequence.

Then, in each of the circuits 402a and 402b, SG2 is set to be at a high level, so that the switch 424 is turned on. Note that, in each of the circuits 402a and 402b, SG1 is at a low level and the transistor 411 whose off-state current is extremely low remains in the off state. In the circuit 402a, the signal (potential) held in the capacitor 412, i.e., the potential VX of the node F is converted into a corresponding signal VXB by the arithmetic circuit 423, and then, once the switch 424 is turned on, input to the node MBa in the feedback loop. Thus, the potential of the node MBa eventually becomes VXB. Then, the potential of the node Ma eventually becomes VX. In the circuit 402b, the signal (potential) held in the capacitor 412, i.e., the potential VYB of the node F is converted into a corresponding signal VY by the arithmetic circuit 423, and then, once the switch 424 is turned on, input to the node MBb in the feedback loop. Thus, the potential of the node MBb eventually becomes VY. Then, the potential of the node Mb eventually becomes VYB. In this way, the data that has been held before the supply of the power supply voltage is stopped is held in the feedback loop again. Then, in each of the circuits 402a and 402b, SG2 is set to be at a low level, so that the switch 424 is turned off again.

In a period 5, fixing of the level (potential) of the clock signal and the inverted signal of the clock signal is stopped. In other words, the clock signal and the inverted signal of the clock signal are returned to the normal state where their levels (potentials) periodically change between high and low levels. In this way, in the nonvolatile register, the feedback loop can restart data writing and reading. The subsequent operation is similar to "Operation During Supplying Power Supply Voltage".

As described above, a path for transferring and writing data held in the feedback loop to the capacitor 412 (data saving path) and a path for returning the data held in the capacitor 412 to the feedback loop (data returning path) are separate. The use of an element with high mobility as the switch 424 placed on the data returning path enables "Operation for Resuming Supply of Power Supply Voltage" to be conducted at higher speed. For example, the use of a transistor comprising a silicon layer or a silicon substrate comprising a channel formation region as the transistor 413 enables "Operation of Resuming Supply of Power Supply Voltage" to be conducted at higher speed.

Up to here, the method for driving the nonvolatile register 400 is described.

<Memory Device and Signal Processing Circuit>

One embodiment of a memory device according to the present invention is a memory device including one or more nonvolatile registers 400 described above. One embodiment of a signal processing circuit according to the present invention is a signal processing circuit including the memory device. For example, the nonvolatile register 400 can be used for a memory device such as a register or a cache memory included in the signal processing circuit.

Further, the signal processing circuit may include some kinds of logic circuits such as an arithmetic circuit which transmits/receives data to/from the memory device in addition to the memory device. Not only the supply of power supply voltage to the memory device but also the supply of power supply voltage to the arithmetic circuit which transmits/receives data to/from the memory device may be stopped.

One embodiment of the signal processing circuit according to the present invention may include a CPU, a memory, and a peripheral control device for controlling access between the memory and the CPU. The CPU, the memory, and the peripheral control device may include the nonvolatile register 400. Further, supply of power supply voltage may be stopped in the entire signal processing circuit including the CPU, the memory, and the peripheral control device.

The use of the nonvolatile register 400 for the signal processing circuit prevents data from being lost by stopping the supply of the power supply voltage and allows the signal processing circuit to return, in a short time after the supply of the power supply voltage is resumed, to the same state as before the supply of the power supply voltage is stopped. This enables the use of a normally-off driving method in which the power supply voltage is supplied only when necessary, thereby dramatically reducing power consumption. Moreover, the operation speed of the signal processing circuit can be increased, which increases reliability.

This embodiment can be freely combined with any of the other embodiments in this specification.

This application is based on Japanese Patent Application serial no. 2012-104839 filed with Japan Patent Office on May 1, 2012, the entire contents of which are hereby incorporated by reference.

What is claimed is:
1. A semiconductor device comprising:
   a CPU comprising cache memory sets and an arithmetic circuit that monitors a frequency of access to the cache memory sets; and
   a power supply control circuit,
   wherein the cache memory sets comprise a line comprising a dirty bit,
   wherein the power supply control circuit stops a supply of a power supply voltage to the CPU in the case where the frequency of access to the cache memory sets is uniform and to resume the supply of the power supply voltage to the CPU,
   wherein the dirty bit of the line shows a match or a mismatch of data stored in the line and data stored in an address of a memory device,
   wherein the address corresponds to the line, and
   wherein the cache memory stores the data stored in the line into the address of the memory device when the dirty bit of the line shows the mismatch before the supply of the power supply voltage to the CPU is stopped.

2. The semiconductor device according to claim 1, wherein the power supply control circuit stops the supply of the power supply voltage to the cache memory sets after storing the data stored in the line into the address of the memory device and before stopping the supply of the power supply voltage to the CPU.

3. The semiconductor device according to claim 1, wherein the cache memory sets do not store the data stored in the line into the address of the memory device when the dirty bit of the line shows the match before the supply of the power supply voltage to the CPU is stopped.

4. The semiconductor device according to any one of claim 1,
   wherein the CPU comprises a nonvolatile register, and
   wherein the nonvolatile register holds data during a supply of the power supply voltage to the CPU being stopped.

5. The semiconductor device according to claim 4,
   wherein the nonvolatile register comprises a transistor and a capacitor,
   wherein the transistor comprises an oxide semiconductor layer comprising a channel formation region,
   wherein a first terminal of the transistor is electrically connected to a first terminal of the capacitor, and
   wherein the capacitor stores charge corresponding to the data held in the nonvolatile register.

6. The semiconductor device according to claim 1,
   wherein the line comprises a valid bit,
   wherein the valid bit shows validity of the data stored in the line,
   wherein a memory cell corresponds to the valid bit comprises a transistor, and
   wherein the transistor resets data stored in the memory cell corresponding to the valid bit when the supply of the power supply voltage to the CPU is resumed.

7. A semiconductor device comprising:
   a CPU comprising cache memory sets and an arithmetic circuit that monitors a frequency of access to the cache memory sets; and
   a power supply control circuit,
   wherein the cache memory sets comprise a first line and a second line,
   wherein each of the first line and the second line comprises a dirty bit,
   wherein the power supply control circuit stops a supply of a power supply voltage to the CPU in the case where the frequency of access to the cache memory sets is uniform, stops the supply of the power supply voltage to the CPU after performing the stop of supplying the power supply voltage on the cache memory sets with a time interval in the case where the frequency of access to the cache memory sets is not uniform, and resumes the supply of the power supply voltage to the CPU, wherein the dirty bit of the first line shows a first match or a first mismatch of data stored in the first line and data stored in a first address of a memory device, wherein the dirty bit of the second line shows a second match or second mismatch of data stored in the second line and data stored in a second address of the memory device, wherein the first address corresponds to the first line, wherein the second address corresponds to the second line, and wherein the cache memory sets store the data stored in the first line into the first address of the memory device when the dirty bit of the first line shows the first mismatch before the supply of the power supply voltage to the CPU is stopped.

8. The semiconductor device according to claim 7, wherein the power supply control circuit stops the supply of the power supply voltage to the cache memory sets after storing the data stored in the first line into the first address of the memory device and before stopping the supply of the power supply voltage to the CPU.

9. The semiconductor device according to claim 7, wherein the cache memory sets do not store the data stored in the second line into the second address of the memory device when the dirty bit of the second line shows the second match before the supply of the power supply voltage to the CPU is stopped.

10. The semiconductor device according to any one of claim 7,
wherein the CPU comprises a nonvolatile register, and
wherein the nonvolatile register holds data during a supply of the power supply voltage to the CPU being stopped.

11. The semiconductor device according to claim 10,
wherein the nonvolatile register comprises a transistor and a capacitor,
wherein the transistor comprises an oxide semiconductor layer comprising a channel formation region,
wherein a first terminal of the transistor is electrically connected to a first terminal of the capacitor, and
wherein the capacitor stores charge corresponding to the data held in the nonvolatile register.

12. The semiconductor device according to claim 7,
wherein each of the first line and the second line comprises a valid bit,
wherein the valid bit of each of the first line and the second line shows validity of the data stored in corresponding one of the first line and the second line,
wherein a memory cell corresponding to the valid bit of each of the first line and the second line comprises a transistor, and
wherein the transistor resets data stored in the memory cell corresponding to the valid bit of each of the first line and the second line when the supply of the power supply voltage to the CPU is resumed.

13. A semiconductor device comprising:
a CPU comprising cache memory sets; and
a power supply control circuit,
wherein the cache memory sets comprise a first set and a second set,
wherein the first set comprises a first line and a second line,
wherein the second set comprises a third line,
wherein each of the first line, the second line, the third line, and the fourth line comprises a dirty bit,
wherein the power supply control circuit stops a supply of a power supply voltage to the CPU and to resume the supply of the power supply voltage to the CPU,
wherein the dirty bit of the first line shows a first match or a first mismatch of data stored in the first line and data stored in a first address of a memory device,
wherein the dirty bit of the second line shows a second match or a second mismatch of data stored in the second line and data stored in a second address of the memory device,
wherein the dirty bit of the third line shows a third match or a third mismatch of data stored in the third line and data stored in a third address of the memory device,
wherein the dirty bit of the fourth line shows a fourth match or a fourth mismatch of data stored in the fourth line and data stored in a fourth address of the memory device,
wherein the first address corresponds to the first line,
wherein the second address corresponds to the second line,
wherein the third address corresponds to the third line,
wherein the fourth address corresponds to the fourth line,
wherein the cache memory sets store the data stored in the first line into the first address of the memory device when the dirty bit of the first line shows the first mismatch before the supply of the power supply voltage to the CPU is stopped,
wherein the CPU comprises an arithmetic circuit that monitors a frequency of access to each of the first set and the second set,
wherein the power supply control circuit stops the supply of the power supply voltage to the second set before stopping the supply of the power supply voltage to the first set, and
wherein the frequency of access to the first set is higher than the frequency of access to the second set.

14. The semiconductor device according to claim 13,
wherein the power supply control circuit stops the supply of the power supply voltage to the cache memory sets after storing the data stored in the first line into the first address of the memory device and before stopping the supply of the power supply voltage to the CPU.

15. The semiconductor device according to claim 13,
wherein the cache memory sets do not store the data stored in the second line into the second address of the memory device when the dirty bit of the second line shows the second match before the supply of the power supply voltage to the CPU is stopped.

16. The semiconductor device according to any one of claim 13,
wherein the CPU comprises a nonvolatile register, and
wherein the nonvolatile register holds data during a supply of the power supply voltage to the CPU being stopped.

17. The semiconductor device according to claim 16,
wherein the nonvolatile register comprises a transistor and a capacitor,
wherein the transistor comprises an oxide semiconductor layer comprising a channel formation region,
wherein a first terminal of the transistor is electrically connected to a first terminal of the capacitor, and
wherein the capacitor stores charge corresponding to the data held in the nonvolatile register.

18. The semiconductor device according to claim 13,
wherein each of the first line and the second line comprises a valid bit,
wherein the valid bit of each of the first line and the second line shows validity of the data stored in corresponding one of the first line and the second line,
wherein a memory cell corresponding to the valid bit of each of the first line and the second line comprises a transistor, and
wherein the transistor resets data stored in the memory cell corresponding to the valid bit of each of the first line and the second line when the supply of the power supply voltage to the CPU is resumed.

19. The semiconductor device according to claim 13,
wherein the power supply control circuit stops the supply of the power supply voltage to the first set after stopping the supply of the power supply voltage to the second set, and
wherein the power supply control circuit stops the supply of the power supply voltage to the CPU after stopping the supply of the power supply voltage to the first set.

* * * * *